United States Patent
Carollo et al.

(10) Patent No.: US 10,095,036 B2
(45) Date of Patent: Oct. 9, 2018

(54) COMPACT NEAR-EYE DISPLAY OPTICS

(71) Applicant: GOOGLE INC., Mountain View, CA (US)

(72) Inventors: Jerome Carollo, San Francisco, CA (US); Xinda Hu, Sunnyvale, CA (US); Serge Bierhuizen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 170 days.

(21) Appl. No.: 15/015,608

(22) Filed: Feb. 4, 2016

(65) Prior Publication Data

US 2017/0227777 A1 Aug. 10, 2017

(51) Int. Cl.
*G02B 27/01* (2006.01)
*G02B 27/14* (2006.01)
*G02B 27/28* (2006.01)

(52) U.S. Cl.
CPC ....... *G02B 27/0176* (2013.01); *G02B 27/148* (2013.01); *G02B 27/286* (2013.01); *G02B 2027/0152* (2013.01)

(58) Field of Classification Search
CPC .......................... G02B 27/148; G02B 27/286; G02B 27/0172; G02B 27/0176; G02B 2027/012; G02B 2027/0123; G02B 2027/0152; G02B 2027/0178; G02B 2027/011; G02B 27/0101; G02B 2027/0121; G02B 6/0076; G02B 6/0088; G02B 27/4205; G02B 27/0018; G02B 2027/0198
See application file for complete search history.

(56) References Cited

U.S. PATENT DOCUMENTS

| 3,682,532 | A |   | 8/1972 | Myles |
|---|---|---|---|---|
| 3,940,203 | A | * | 2/1976 | La Russa ............. G02B 5/3083 359/15 |
| 4,163,542 | A | * | 8/1979 | La Russa ............. G02B 5/3083 359/15 |
| 4,867,551 | A |   | 9/1989 | Perera |

(Continued)

FOREIGN PATENT DOCUMENTS

| EP | 1096293 A2 | 5/2001 |
|---|---|---|
| WO | 2015157482 A1 | 10/2015 |

OTHER PUBLICATIONS

International Search Report and Written Opinion received for PCT Patent Appliation No. PCT/US2016/066540, dated Apr. 7, 2017, 10 pages.

*Primary Examiner* — Bryan Earles
(74) *Attorney, Agent, or Firm* — Brake Hughes Bellermann LLP

(57) ABSTRACT

Systems and methods that employ a near-eye display system including an optical assembly are described. The optical assembly may include a head-mounted display device worn by a user in which the head-mounted display device adapted to house an image projecting device and an optical assembly. The optical assembly may include, for at least one eyepiece, a first flat filter stack operable to be oriented in a first direction. and a second flat filter stack operable to be oriented in a second direction. The near-eye display system assembly may also include a display panel adapted to receive image content from the image projecting device, wherein the display panel is adapted to be oriented in the second direction.

20 Claims, 14 Drawing Sheets

(56) References Cited

U.S. PATENT DOCUMENTS

| | | | |
|---|---|---|---|
| 6,091,546 A * | 7/2000 | Spitzer | G02B 27/017 345/8 |
| 6,144,439 A | 11/2000 | Carollo | |
| 6,271,969 B1 | 8/2001 | Mertz | |
| 8,472,120 B2 | 6/2013 | Border et al. | |
| 8,477,425 B2 | 7/2013 | Border et al. | |
| 8,488,246 B2 | 7/2013 | Border et al. | |
| 9,134,534 B2 | 9/2015 | Border et al. | |
| 9,507,066 B2 * | 11/2016 | Kollin | G02B 5/3016 |
| 2002/0159150 A1 | 10/2002 | King et al. | |
| 2012/0147465 A1 | 6/2012 | Ruhle et al. | |
| 2012/0212400 A1 | 8/2012 | Border et al. | |
| 2015/0049390 A1 | 2/2015 | Luebke et al. | |
| 2015/0268474 A1 | 9/2015 | Cheng et al. | |

* cited by examiner

COMPACT NEAR-EYE DISPLAY OPTICS

TECHNICAL FIELD

This description generally relates to optical technology used in interactive head-mounted display (HMD) devices.

BACKGROUND

Near-eye displays may be included in a wearable display, such as a head-mounted display (HMD) device. An HMD device provides image content in a near-eye display close to one or both eyes of a wearer. To generate the image content on such a display, a computer processing system may be used. Such displays may occupy a wearer's entire field of view, or only occupy a portion of the wearer's field of view.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a near-eye display system assembly that includes a head-mounted display device worn by a user. The head-mounted display device may be adapted to house an image projecting device and an optical assembly that may include for at least one eyepiece: a first flat filter stack operable to be oriented in a first direction, the first flat filter stack including at least one surface coated with a flat beam splitting layer, a second flat filter stack operable to be oriented in a second direction, and a display panel adapted to receive image content from the image projecting device. In some implementations, the display panel may be adapted to be oriented in the second direction.

Implementations can include one or more of the following features, alone or in combination with one or more other features. The first flat filter stack may be adjacent to the second flat filter stack and configured into a stacked arrangement, in which the first flat filter stack includes a first linear polarizer stacked between a display panel and a first quarter wave plate, the first quarter wave plate stacked between the first linear polarizer and a beam splitter and the second flat filter stack includes a polarizing beam splitter stacked between a second quarter wave plate stacked after the beam splitter and a polarizing beam splitter, the polarizing beam splitter stacked between the second quarter wave plate and a second linear polarizer. The second linear polarizer may be adjacent to at least one refracting lens. In some implementations, the display panel is configured to be positioned adjacent to the focal point of the optical assembly to form a virtual image of such display panel to modify a field of view of the near-eye display system.

In some implementations, the optical assembly further includes at least one fixed lens for the at least one eyepiece, the at least one fixed lens being disposed in the head-mounted display device adjacent to the second flat filter stack and adapted to receive image content originating at the image projecting device and through the optical assembly toward the second flat filter stack.

In some implementations, the first flat filter stack is adapted to be tilted in the first direction at an angle from about zero to about 12.5 degrees from the normal direction to the plane of the display panel, and the second flat filter stack is adapted to be tilted in the second direction at an angle from about zero to about 12.5 degrees from the normal direction to the plane of the display panel, in response to tilting the display panel from about zero to about 25 degrees from the normal direction to the plane of a bottom edge of the head-mounted display device such that the display panel is seated perpendicular to the optical axis of the near eye display system.

Another general aspect includes a method of filtering light for a near-eye display system. The method may include receiving a light beam at a display panel and from a display that directs light through a first linear polarizer in a first filter stack and having the first linear polarizer transmitting the light beam into a first quarter-wave plate in the first filter stack. The light beam may become circularly polarized in a first direction and then further transmitted through a beam splitter in the first filter stack. The beam splitter may be operable to transmit at least some of the light beam to a second quarter wave plate in a second filter stack. The method may also include transmitting a first portion of the light beam from the second quarter wave plate to a polarizing beam splitter in the second filter stack to transform the first portion into a linearly polarized light beam. The polarizing beam splitter may be operable to reflect a second portion of the linearly polarized light beam through the second quarter wave plate to the beam splitter, the second portion becoming circularly polarized in a second direction after reflecting off of the beam splitter. The method may also include transmitting the second portion from the beam splitter through the second quarter wave plate and through the polarizing beam splitter, through a second linear polarizer in the second filter stack, and through at least one lens to provide a refracted image to an eyepiece of the near-eye display system.

Implementations can include one or more of the following features, alone or in combination with one or more other features. The first portion of the light beam may be orthogonal to a passing state of the polarizing beam splitter, and the second portion of the light beam may be parallel to the passing state of the polarizing beam splitter.

In some implementations, the first direction includes right hand circularly polarized and the second direction includes left hand circularly polarized. At least some of the light beam from the display may be passed into the first quarter wave plate from the first linear polarizer, wherein the first quarter wave plate is seated at about 45 degrees off of a vertical, the vertical corresponding to a longitudinal edge of the first filter stack.

In some implementations, the first filter stack and the second filter stack are flat, non-curved elements. In some implementations, the axes of the first linear polarizer and the second linear polarizer are orthogonal and the axes of the first quarter wave plate and the second quarter wave plate may be orthogonal. In addition, the first filter stack and second filter stack may not provide any optical magnification.

In some implementations, the beam splitter comprises a partial-mirror coating on the first filter stack and performs a beam splitting ratio of about 50 percent, and about 25 percent of the second portion is transmitted from the beam splitter to the display if the display is linearly polarized, or about 12.5 percent of the second portion is transmitted from the beam splitter to the display if the display is unpolarized.

Another general aspect includes a system with an interactive head-mounted display device worn by a user, the interactive head-mounted display device adapted to house an image projecting device and an optical assembly, the optical assembly including at least one eyepiece, at least one refracting lens, a first filter stack operable to filter and split light received from the image projecting device, the first filter stack including a first linear polarizer and a beam splitter coating on a first quarter wave plate, a second filter stack including a second quarter wave plate, a polarizing beam splitter, and a second linear polarizer, the second filter stack operable to fold an optical path between the at least one refracting lens and the image projecting device, a display panel adapted to receive image content from the image projecting device, and at least one processor for handling image content for display on the image projecting device.

Implementations can include one or more of the following features, alone or in combination with one or more other features. The beam splitter may include a partial-mirror coating on the first filter stack, the beam splitter coating operable to split light with a splitting ratio of about 50 percent, and wherein about 25 percent of the second portion is transmitted from the beam splitter to the display if the display is linearly polarized, or about 12.5 percent of the second portion is transmitted from the beam splitter to the display if the display is unpolarized.

In some implementations, the first filter stack may be coupled to the second filter stack and configured into a stacked arrangement including a first filter stack operable to be oriented in a first direction, the first filter stack including at least one flat beam splitting layer, a second flat filter stack operable to be oriented in a second direction, and a display panel adapted to receive image content from the image projecting device, wherein the display panel is adapted to be oriented in the second direction.

In some implementations, the first flat filter stack is adapted to be tilted in the first direction at an angle from about zero to about 12.5 degrees from the normal direction to the plane of the display panel, and the second flat filter stack is adapted to be tilted in the second direction at an angle from about zero to about 12.5 degrees from the normal direction to the plane of the display panel, in response to tilting the display panel from about zero to about 25 degrees from the normal direction to the plane of a bottom edge of the head-mounted display device such that the display panel is seated perpendicular to the optical axis of the near eye display system.

In some implementations, the image projecting device is a display on a mobile computing device, the display being an organic light emitting display (OLED). In some implementations, the image projecting device is a display on a mobile computing device, the display being a liquid crystal display (LCD) and wherein the second filter stack is configured without a linear polarizer. In some implementations, the display is a reflective display and includes a liquid crystal on silicon (LCOS) display.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
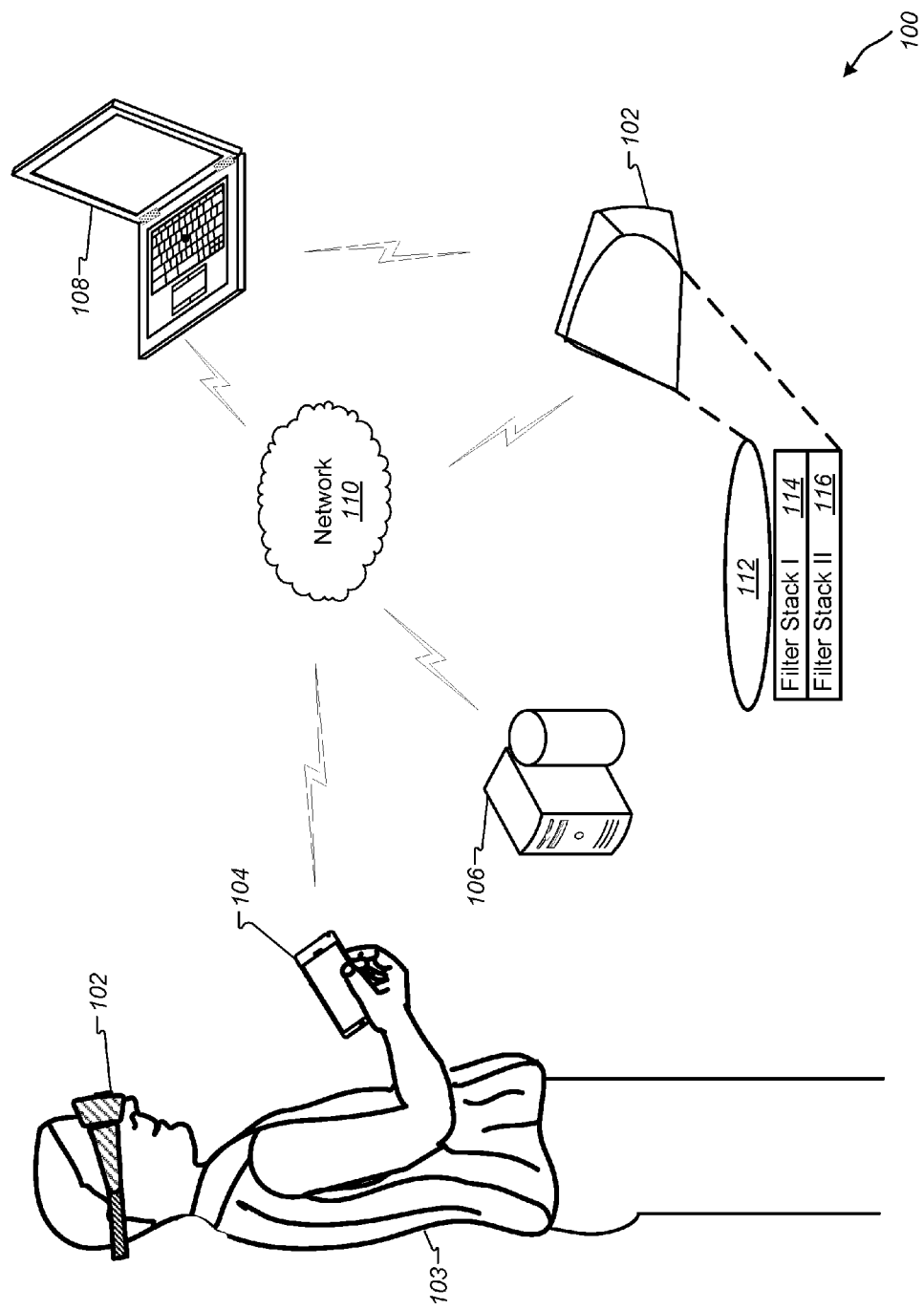
FIG. 1 is a block diagram of an example system for rendering image content in a head-mounted display (HMD).

Accessing virtual reality (VR) content generally includes having a user wear an HMD device that can be configured to function with a mobile computing device (or other display) inserted into the HMD device. Such HMD devices can include optical componentry that provide magnification, polarization, filtering, and/or image processing for images provided by the mobile computing device. The methods and systems described in this disclosure may include optical features for such HMD devices that provide the advantage of reducing the size of an optical assembly housed in an HMD device. Such a reduction of the optical assembly can allow reduction of the display space within the HMD device, thereby reducing the size, weight, and moment of inertia of the HMD device when worn by the user. A reduced size and weight of the HMD device may provide the advantage of further integrating the user into a virtual reality environment because wearing a lighter weight and/or smaller device can reduce the awareness of wearing the HMD device while accessing the virtual reality environment.

The systems and methods described in this disclosure may include using optical assemblies and optical methods to reduce HMD device thickness while taking advantage of lens systems that interact and integrate well with mobile computing device displays. In some implementations, the optical assemblies and methods can employ at least two flat polarization filter stacks (for at least one eyepiece or for each of a left and right eyepiece) to fold the optical path between a long focal length magnifying lens and a display panel.

Such an assembly can significantly reduce the lens display space within the HMD device. For example, the lens display space can be reduced up to about 60 percent to about 70 percent of typical lens display space used by a mobile computing device-based HMD device. In one non-limiting example, the lens display space may be reduced from about 39 millimeters to about 13 millimeters. In other examples, the lens display space may be reduced from about 39 millimeters to about 13.5 millimeters. In another non-limiting example, the lens display space may be reduced from about 39 millimeters to about 12.48 millimeters. In another non-limiting example, the lens display space may be reduced from about 45 millimeters to about 15.75 millimeters. In another non-limiting example, the lens display space may be reduced from about 40 millimeters to about 16 millimeters. In another non-limiting example, the lens display space may be reduced from about 40 millimeters to about 13 millimeters.

Reducing the lens display space in this fashion can function to move the HMD device center of gravity closer to the head of the user wearing the device, thereby reducing the moment of inertia of the user. The reduced lens display space can additionally provide aesthetic advantages resulting in a streamlined, low-profile HMD device.

The systems and methods described in this disclosure may utilize hybrid optical assemblies and optical methods to achieve a compact near-eye display (e.g., within an HMD device) for virtual reality. Such a display may reduce the thickness of the HMD device while improving moment of inertia and industrial design, similar to the other optical assemblies described herein. The hybrid optical assemblies can include inline structures that employ additional optical elements between two or more filter stacks. In one non-limiting example, a beam splitting layer manufactured on a surface of a curved lens may be housed between two or more filter stacks. In some implementations, the optical elements in the hybrid optical assemblies may include a curved lens with a beam splitter coating as well as two or more optical lenses adapted to further reduce optical aberrations and improve image quality. In general, the hybrid optical assemblies can provide the advantages of having lower optical aberrations from many of the optical elements, less spherical aberration, less astigmatism, and less coma. The hybrid optical assemblies described herein may also include a positive mirror surface, which can allow a user to resolve smaller display pixels. In some implementations, the hybrid optical assembly may be housed in an HMD device housing that is slightly larger than the non-hybrid optical assemblies described herein. Increasing the HMD device housing for a hybrid optical assembly can reduce pupil swimming (i.e., reduce the effect that occurs when an image displayed in an HMD device distorts as a user moves her eye around a lens provided in the HMD device). The hybrid optical assemblies can also provide a balance of field curvature as positive refractive elements may be used to balance the field curvature of a concave mirror housed within the assembly of two optical filter stacks.

The systems and methods described in this disclosure may include using variably tilted optical assemblies within the HMD device. In one such example, a display panel for both a left and a right eye can be designed to be tilted such that the top of the displays are angled toward the eyes of the user and the bottom of the displays are angled away from the eyes of the user. In another example, one or both filter stacks within a particular optical assembly (for each eyepiece) can be designed to be oriented and/or angled in a direction toward or away from the eyepiece.

Providing variably tilt-able components within an optical assembly for HMD devices may provide the advantage of increasing nose clearance without changing the shape of an HMD device. In addition, allowing tilt-able display panels may save a manufacturer design time and cost while providing an improved image to the user. In some implementation, tilting one or more components can also provide a translational effect which can increase the center clearance between the two (i.e., left and right) display panels.

Referring to FIG. 1, a virtual reality (VR) system and/or an augmented reality (AR) system may include, for example, an HMD device 102 or similar device worn by a user 103, on a head of the user, to generate an immersive virtual world environment to be experienced by the user. The HMD device 102 may represent a virtual reality headset, glasses, one or more eyepieces, or other wearable device capable of displaying virtual reality content. In operation, the HMD device 102 can execute a VR application (not shown) which can playback received and/or processed images to a user.

FIG. 1 is a diagram that illustrates a system 100 with a user interacting with content on a mobile computing device 104. In the example shown in FIG. 1, the user may be accessing content (e.g., images, audio, video, streaming content, etc.) via mobile computing device 104 to HMD device 102. In some implementations, one or more content servers (e.g., server 106) and one or more computer-readable storage devices can communicate with the mobile computing device 104 using a network 110 to provide the content to the mobile computing device 104, which may feed the content to HMD device 102. The content can be stored on the mobile computing device 104 or another computing device.

In the example implementation shown in FIG. 1, the user 103 is wearing the HMD device 102 and holding mobile computing device 104. Movement of the user in the real world environment may be translated into corresponding movement in the virtual world environment using sensors and software on the mobile computing device 104. In some implementations, the mobile computing device can be interfaced to/connected to the HMD device 102. In some implementations, the mobile computing device 104 can execute a VR application.

The mobile computing device 104 may interface with a computer-generated, 3D environment in a VR environment. In these implementations, the HMD device 102 includes a screen and optical assemblies that include at least a lens 112, a filter stack 114, and a filter stack 116. The filter stacks 114 and 116 will be described in detail throughout this disclosure. The filter stacks 114 and 116 may be included in optical assemblies for each eyepiece in the HMD device 102. In some implementations, other optical elements may be disposed between, coated upon, or otherwise coupled or affixed to the filter stack 114 and/or the filter stack 116.

The mobile computing device 104 may be a portable electronic device, such as, for example, a smartphone, or other portable handheld electronic device that may be paired with, or operably coupled with, and communicate with, the HMD device 102 via, for example, a wired connection, or a wireless connection such as, for example, a Wi-Fi or Bluetooth connection. This pairing, or operable coupling, may provide for communication and exchange of data between the mobile computing device 104 and the HMD device 102. Alternatively, a server device 106 or local computer 108 (or other device accessible by the user) may function to control HMD device 102 via network 110.

In some implementations, the HMD device 102 can connect to/communicate with the mobile computing device 104 (or other device 106, 108, etc.) using one or more high-speed wired and/or wireless communications protocols (e.g., WiFi, Bluetooth, Bluetooth Low Energy (LE), Universal Serial Bus (USB), USB 3.0, USB Type-C, etc.). In addition, or in the alternative, the HMD device 102 can connect to/communicate with the mobile computing device using an audio/video interface such as High-Definition Multimedia Interface (HDMI). In some implementations, the content displayed to the user on the screen included in the HMD device 102 may also be displayed on a display device that may be included in device 106 and/or 108. This allows someone else to see what the user may be interacting with in the VR space.

In the example system 100, the devices 104, 106, and 108 may be a laptop computer, a desktop computer, a mobile computing device, or a gaming console. In some implementations, the device 104 can be mobile computing device that can be disposed (e.g., placed/located) within the HMD device 102. The mobile computing device 104 can include a display device that can be used as the screen for the HMD device 102, for example. Devices 102, 104, 106, and 108 can include hardware and/or software for executing a VR application. In addition, devices 102, 104, 106, and 108 can include hardware and/or software that can recognize, monitor, and track 3D movement of the HMD device 102, when these devices are placed in front of or held within a range of positions relative to the HMD device 102. In some implementations, devices 104, 106, and 108 can provide additional content to HMD device 102 over network 110. In some implementations, devices 102, 104, 106, and 108 can be connected to/interfaced with one or more of each other either paired or connected through network 110. The connection can be wired or wireless.

In some implementations, the network 110 can be a public communications network (e.g., the Internet, cellular data network, dialup modems over a telephone network) or a private communications network (e.g., private LAN, leased lines). In some implementations, the mobile computing device 104 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The system 100 may include electronic storage. The electronic storage can include non-transitory storage media that electronically stores information. The electronic storage may be configured to store captured images, obtained images, pre-processed images, post-processed images, etc.

Figure 2:
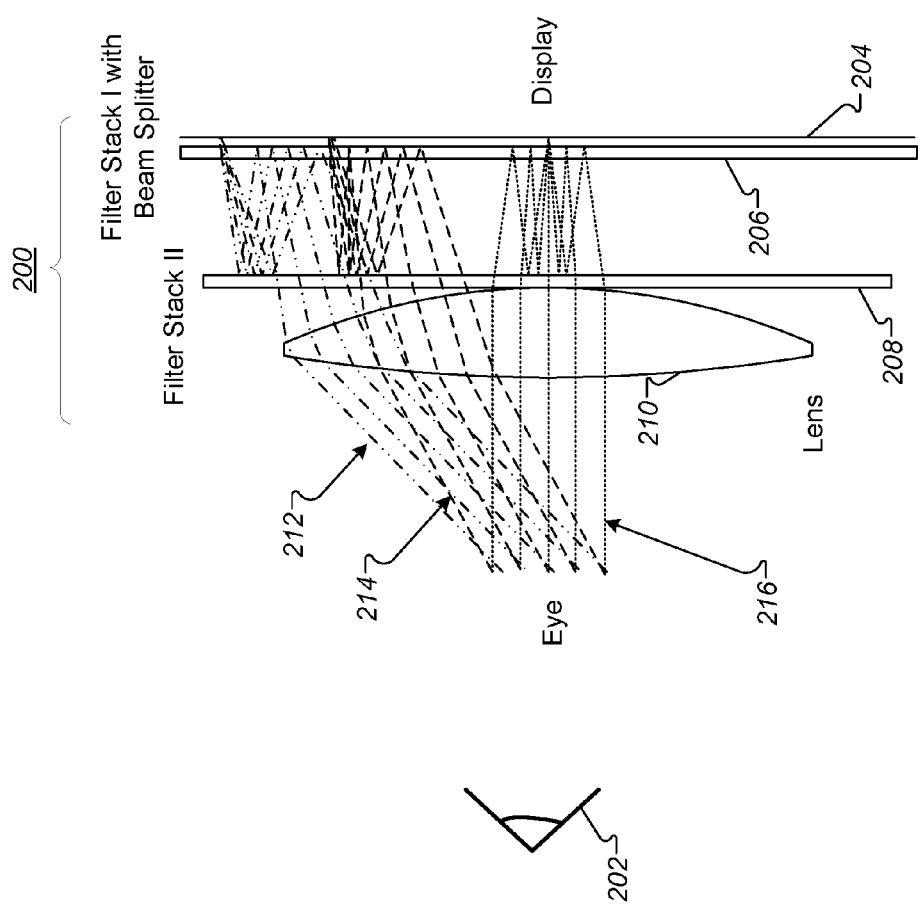
FIG. 2 is a block diagram depicting an example optical assembly.

FIG. 2 is a block diagram depicting an example optical assembly 200. The optical assembly 200 may be installed as part of an HMD device intended for accessing virtual reality content. As shown in FIG. 2, an eye 202 of a user is simulated to the left of the optical assembly 200 and a display panel 204 is shown to the right of the optical assembly 200. In some implementations, an optical assembly 200 may be included for each of a left and right eyepiece. In some implementations, the optical assembly 200 may be included in a single eyepiece.

The optical assembly 200 includes the display panel 204, a first flat filter stack 206 that includes a beam splitter (not shown), a second flat filter stack 208, and a lens 210. The optical assembly 200 can function to fold the optical path of light presented by display panel 204 and through the filter stacks 206 and 208. In this example, example folded optical paths are shown by paths 212, 214, and 216.

In one non-limiting example, the optical assembly 200 can be installed in a system that includes an interactive HMD device (e.g., device 102) worn by a user (e.g., user 103). The interactive HMD device may be adapted to house an image projecting device (e.g., device 104) and an optical assembly (e.g., 200). In some implementations, the image projecting device includes a display on a mobile computing device. In some implementations, the display may be an organic light emitting display (OLED). In other implementations, the display may be a liquid crystal display (LCD). In yet other implementations, the display may be a reflective display that includes a liquid crystal on silicon (LCOS) display. Other display technologies may be used, as described in detail below.

The optical assembly 200 may include at least one refracting lens 210. In some implementations, the at least one refracting lens 210 may be designed to provide a focal length of about 30 millimeters to about 50 millimeters, while the distance between the lens and the display may be about 13 millimeters to about 20 millimeters due to the optical folding of the two filter stacks 206 and 208. In some implementations, the optical assembly 200 includes a plurality of refracting lenses or lens arrays.

Figure 3:
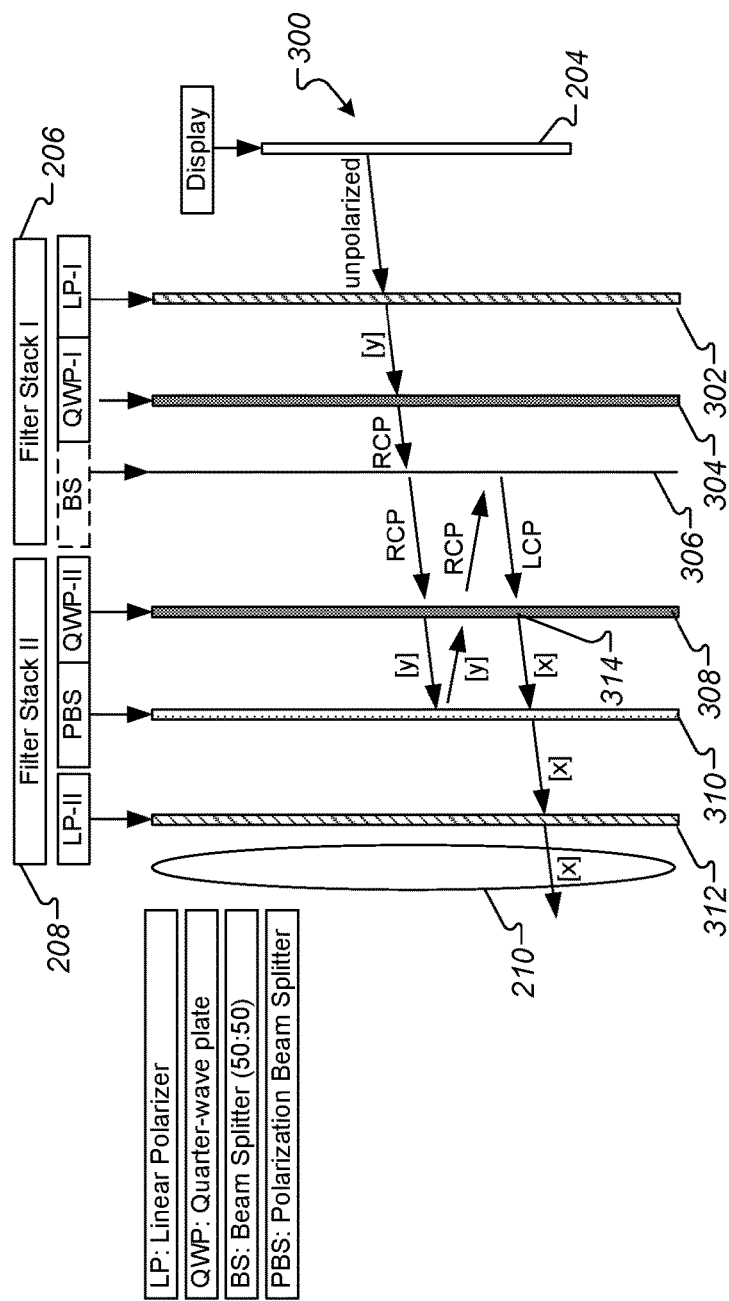
FIG. 3 is a diagram depicting an example polarization path of light travelling through the optical assembly illustrated in FIG. 2.

An example assembly of the first filter stack 206 may include a first linear polarizer and a beam splitter layer applied as a coating to a first quarter wave plate within the assembly (shown in detail with respect to FIG. 3). The first filter stack 206 may be operable to filter and split light received from the image projecting device. In some implementations, the quarter wave plates can be designed to function well in broadband to provide a constant phase shift independent of the wavelength of light that is used. This wavelength independence may be achieved by using two different birefringent crystalline materials. The relative shifts in retardation over the wavelength range (i.e., dispersion) can be balanced between the two materials used. The second filter stack 208 may include a quarter wave plate, a polarizing beam splitter, and a linear polarizer within the assembly (shown in detail with respect to FIG. 3). The second filter stack 208 may be operable to fold an optical path between the at least one refracting lens 210 and the image projecting device (e.g., mobile computing device 104).

In some implementations, the optical assembly 200 also includes a display panel adapted to receive image content from the image projecting device (e.g., mobile computing device 104). In some implementations, the optical assembly 200 also includes at least one processor for handling image content for display on the image projecting device. In particular, as described above with respect to FIG. 1, image content can be provided by one or more processors, computers, or other resources, and can be displayed, stored, and/or modified using image projecting device (e.g., mobile computing device 104, etc.).

FIG. 3 is a diagram depicting an example polarization path 300 of light travelling through the optical assembly 200 illustrated in FIG. 2. Here, the filter stacks 206 and 208 are shown disposed between the display panel 204 and the lens 210.

In one non-limiting example, the first filter stack 206 is coupled to the second filter stack 208 and configured into a stacked arrangement with other components. One such example of a stacked arrangement may include a first linear polarizer 302 that is adjacent to the display panel 204 and stacked adjacent to a first quarter wave plate 304. The first quarter wave plate 304 is stacked or coated with a beam splitter layer 306, which is stacked beside a second quarter wave plate 308 on a first side of the plate 308. A second side of the second quarter wave plate 308 is stacked beside a polarizing beam splitter 310, which is stacked beside a second linear polarizer 312. The second linear polarizer 312 is adjacent to the at least one refracting lens 210.

In some implementations, the beam splitter layer 306 includes a partial-mirror coating on the first filter stack 206. The beam splitter layer 306 may be operable to split light beams/rays with a splitting ratio of about 50 percent. In some implementations, the beam splitter layer 306 may perform with a beam splitting ratio of about 50 percent and can have a maximum transmission of about 25 percent if the display is linearly polarized or about 12.5 percent if the display is unpolarized. In some implementations, the beam splitter layer 306 is not included in the first filter stack 206 and is instead a standalone device positioned between filter stack 206 and filter stack 208.

In some implementations, the second filter stack 206 is configured without the linear polarizer 302 in the event that the image projecting device includes a non-emissive display, such as an LCD display. The linear polarizer 302 may be excluded, for example, because an LCD display generally provides linearly-polarized output.

In some implementations, the linear polarizer 312 in the filter stack 208 is an optional component included so that the scattered light from a user's face (i.e., illuminated by the display light) is not reflected directly by the polarizing beam splitter 310. Such reflections may negatively affect a viewing experience and accordingly, including elements to deter this provide the user an improved viewing experience.

The components shown in FIGS. 2 and 3 may provide any number of possible polarization paths when light is introduced to one or more of the components. One example polarization path 300 may include the display panel 204 receiving emitted light (from mobile computing device 104) to be linearly polarized by linear polarizer 302. The light may become circularly-polarized after passing through the quarter-wave plate 304, which may be placed at 45-degree angle. For example, the first quarter wave plate may be seated at about 45 degrees off a vertical that corresponds with the longitudinal edge of the first filter stack 206. The light is then partially reflected by the beam splitter 306, which changes the handedness of its circular polarization. The light can be passed to the quarter-wave plate 308, which rotates the circularly-polarized light back to linearly-polarized.

The linearly-polarized light, which is orthogonal to the passing state of the polarizing beam splitter 310, can be reflected by and become circularly-polarized again after passing back through the quarter wave plate 308. After passing through the quarter wave plate 308 the third time (at point 314), the light becomes linearly-polarized, which can be parallel to the passing state of the polarizing beam splitter 310. The transmitted light, after passing through another optional linear polarizer 312, can be refracted by a lens/group of lenses 210 to form a virtual image to be presented to an eyepiece of an HMD device and the eye of the user.

Although the components described throughout this disclosure may be shown and/or described as encapsulated/connected to other components, each component can be adhesively bound to adjacent components. Alternatively, each component can be mechanically connected, or frictionally bound to adjacent components. In other implementations, none of the components are bound or connected, but may function together as a unit housed in an assembly. In some implementations, portions of the components may be coated, while other portions remain uncoated. Lens devices shown throughout this disclosure may be standalone or integrated into a manufactured assembly. In addition, although only one lens is shown in particular diagrams, multiple lenses can be substituted. In addition, when one optical assembly is depicted, additional optical assemblies may be included in an HMD device. For example, optical assemblies can be duplicated with the HMD device to provide one optical assembly for each eyepiece.

By way of a non-limiting example, the filter stack 208 may be a standalone piece or may be bonded to the front refracting lens (or group of lenses). Similarly, the filter stack 206 may be a stand-alone piece or an integrated layer of the display panel 204. In some implementations, a filter stack configuration includes the axes of the linear polarizer 302 and the linear polarizer 312 being orthogonal. Similarly, the axes of the first quarter wave plate 304 and the second quarter wave plate 308 may be orthogonal.

Figure 4:
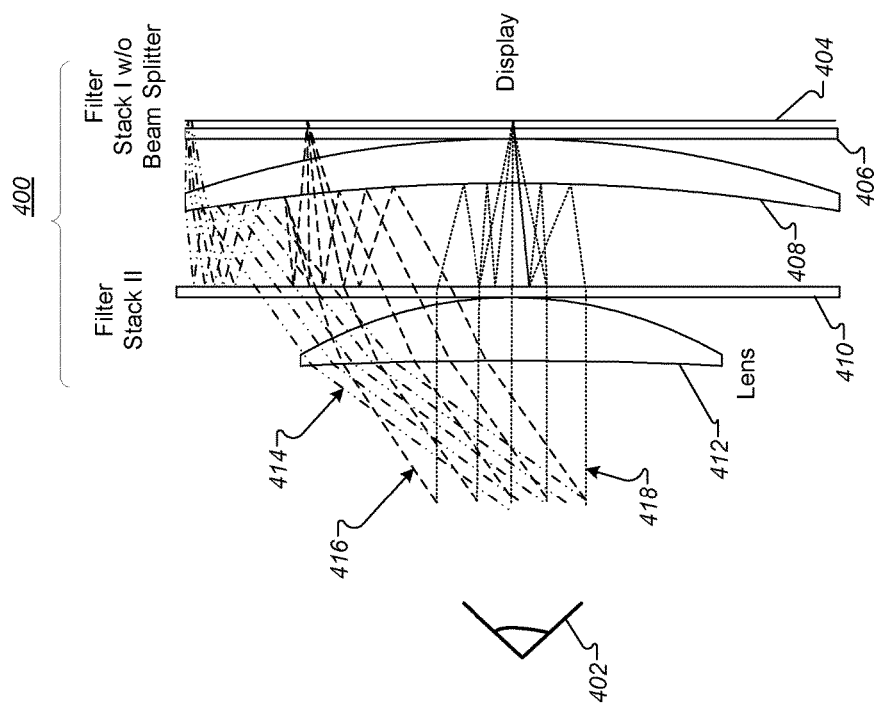
FIG. 4 is a block diagram depicting an example hybrid optical assembly.

FIG. 4 is a block diagram depicting an example hybrid optical assembly 400. The hybrid optical assembly 400 may include one or more optical elements in between two filter stacks 406 and 410. The hybrid optical assembly 400 may additionally place a beam splitting layer on a curved surface of a lens inserted between the two filter stacks 406 and 410. One advantage to using the hybrid optical assembly 400 may include providing lower optical aberrations from included optical elements and the use of positive mirror surface, which can allow a viewer to resolve smaller display pixels.

In some implementations, the display space within an HMD device housing the hybrid optical assembly 400 may provide telecentricity allowing improved focus adjustment when or if a display panel is shifted axially. In this configuration, the image magnification and distortion may remain constant when one or more of the display panels shift axially for focus adjustment.

As shown in FIG. 4, an eye 402 of a user is simulated to the left of the optical assembly 400, while a display panel 404 is shown to the right of the optical assembly 400. The optical assembly 400 includes a first flat filter stack 406, a curved lens 408 that includes a beam splitter layer built in (not shown), a second flat filter stack 410, and a lens 412.

In some implementations, the lens 412 may be included in the optical assembly for each of the left and right eyepiece. The lens 412 may be disposed in the HMD device adjacent to the filter stack 410 and adapted to receive image content originating at the image projecting device/mobile computing device and through the optical assembly toward the filter stack 410.

The optical assembly 400 can function to fold the optical path of light presented by display panel 404 and through the filter stacks 406 and 410. In this example, example folded optical paths are shown by paths 414, 416, and 418. In the depicted example, the curved lens 408 may include a beam splitter coating including a positive mirror surface configured to resolve display pixels. The lens 408 may be disposed such that the concave side faces the filter stack 410 and the convex side faces filter stack 406. In some implementations, the optical assembly 400 may be telecentric when the average angle of ray bundles on the display surface is close to perpendicular.

Figure 5:
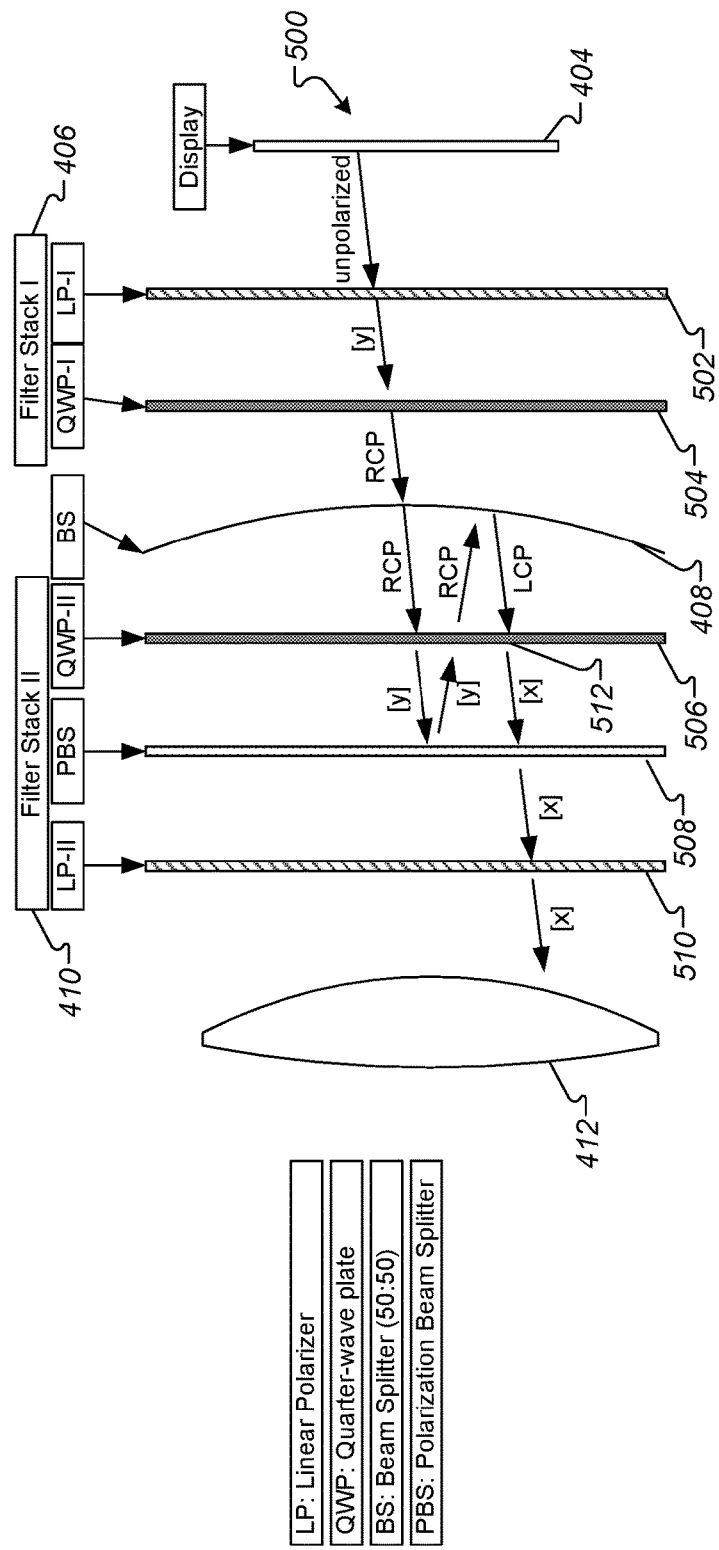
FIG. 5 is a diagram depicting an example polarization path of light travelling through the hybrid optical assembly illustrated in FIG. 4.

FIG. 5 is a diagram depicting an example polarization path 500 of light travelling through the hybrid optical assembly 400 illustrated in FIG. 4. Here, the filter stacks 406 and 410 are disposed between the display panel 404 and lens 412.

In one non-limiting example, the first filter stack 406 is coupled to the second filter stack 410 and configured into a stacked arrangement with other components. One such example of a stacked arrangement may include a first linear polarizer 502 that is adjacent to the display panel 404 and next to a first quarter wave plate 504. The first quarter wave plate 504 is stacked adjacent to a curved lens 408, which is stacked adjacent to a second quarter wave plate 506. The second quarter wave plate 506 is stacked adjacent to a polarizing beam splitter 508, which is stacked adjacent to a second linear polarizer 510. The second linear polarizer 510 is adjacent to the at least one lens 412.

In some implementations, the lens 412 may be a refracting lens. In some implementations, multiple lenses or lens arrays may take the place of lens 412.

In general, the lenses 408 and 412 may be non-rotationally symmetrical. Non-rotationally symmetrical lenses 408 and 412 can be beneficial whenever the system is no longer rotationally symmetric. For example, as shown in the hybrid optical assembly 700 of FIG. 7, the system may no longer be rotationally symmetric because the lenses are decentered and/or tilted optically. In another example, the system may no longer be rotationally symmetric when the display is curved differently in two orthogonal meridians (e.g., cylinder, saddle-shape, etc.). In some implementations, using non-rotationally symmetrical lenses can provide the advantage of successfully balancing the aberrations to achieve a uniform image quality across the field of view.

The components shown in FIGS. 4 and 5 may provide any number of possible polarization paths of light traveling through the components. One example polarization path 500 may include the display panel 404 emitting light to be linearly polarized by linear polarizer 502. The light may become circularly-polarized after passing through the quarter-wave plate 504, which may be placed at 45-degree angle. For example, the quarter wave plate 504 may be seated at about 45 degrees off a vertical that corresponds with the longitudinal edge of the first filter stack 406. The light may be partially reflected by the curved lens 408, which can change the handedness of its circular polarization from right to left. The light can be passed to the quarter-wave plate 506, which can rotate the circularly-polarized light back to linearly-polarized.

The linearly-polarized light, which may be orthogonal to the passing state of the polarizing beam splitter 508, may be reflected by and become circularly-polarized again after passing back through quarter wave plate 506. After passing through quarter wave plate 506 the third time (at location 512), the light may become linearly-polarized, which may be parallel to the passing state of the polarizing beam splitter 508. The transmitted light, after passing through another optional linear polarizer 510, may be refracted by a lens/group of lenses 412 and may form a virtual image to be presented to an eyepiece of an HMD device and the eye of the user.

Figure 6:
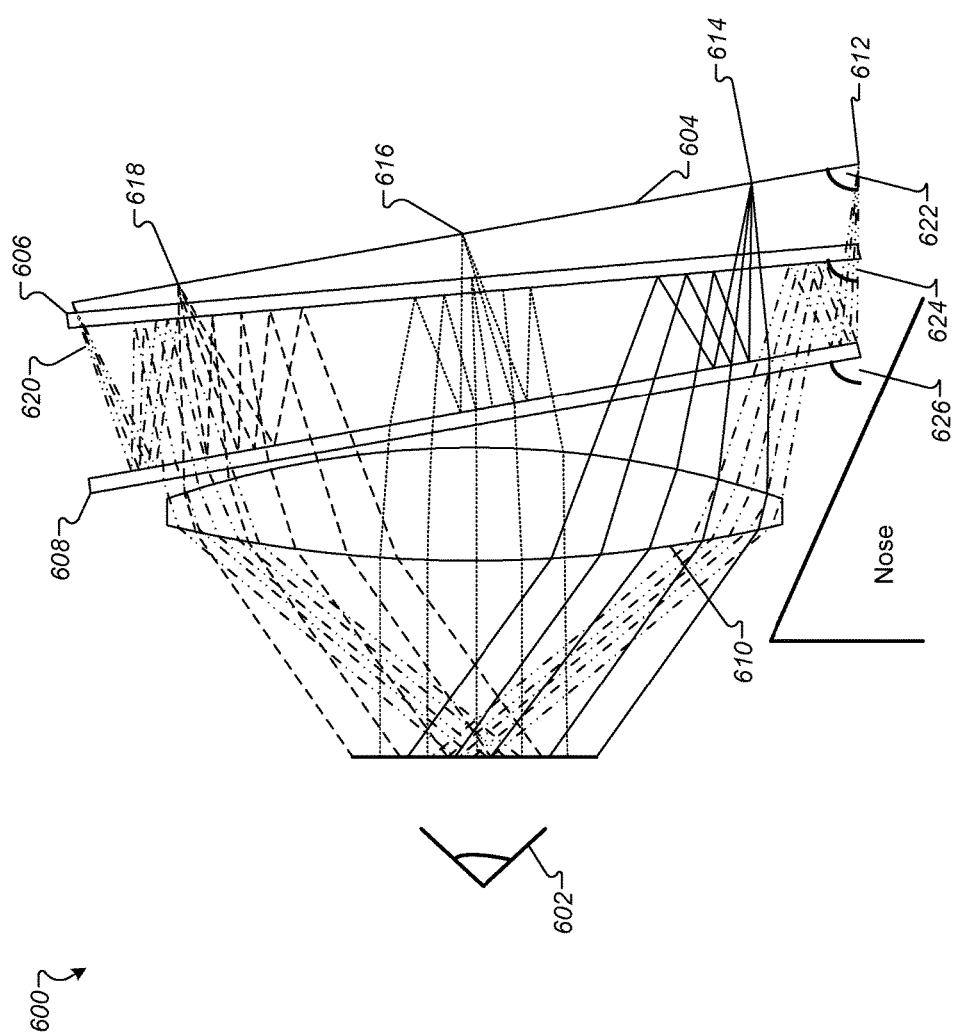
FIG. 6 is a block diagram of a variably tilted optical assembly.

FIG. 6 is a block diagram of a variably tilted optical assembly 600. The variable tilt may refer to tilting or reorienting of one or more of the filter stacks within the optical assembly 600. Alternatively, the tilting may refer to being able to tilt a display panel housed near filter stacks within the optical assembly 600. In some implementations, the tilting may be based on an angular relationship between one or more filter stacks to the display panel and/or to the lens.

As shown in FIG. 6, an eye 602 of a user is simulated to the left of the optical assembly 600 and a display panel 604 is shown to the right of the optical assembly 600. The optical assembly 600 includes the display panel 604 and a first flat filter stack 606 that includes a beam splitter (not shown), a second flat filter stack 608. The optical assembly 600 also includes a lens 610 adjacent to the filter stack 608. The optical assembly 600 can function to fold the optical path of light presented by display panel 604 and through the filter stacks 606 and 608. In this example, example folded optical paths are shown by paths 612, 614, 616, 618, and 620.

Optical assembly 600 may include components described with respect to FIGS. 2 and 3. As such, optical assembly 600 may provide examples pertaining to a tilt-able optical assembly 200. In this example, by tilting the display panel 604 at an angle 622 relative to the optical axis of lens 610, a variable space can be created between surfaces of a front polarization filter stack (e.g., filter stack 608) and a beam splitting surface coated on filter stack 606. In operation, the display panel for each of a left and right display area can be tilted so that the corners or edges of the display panel are further outward which may provide the advantage of significantly increasing the nose clearance, without the need to make a custom shaped HMD display. The tilting may additionally have a translational effect, which increases the center clearance between the two display panels (for each eye). In some implementations, tilting the two displays can also help make the HMD device form better to the face of a user, ultimately allowing a compact and appealing-looking industrial design.

As shown, two flat filter stacks 606 and/or 608 may also be adjusted (i.e., tilted) to form an angle 624 in which the display panel 604 can be moved to match such an angle. In some implementations, the filter stack 606 may be adjusted to form an angle 626 in which the display panel 604 can be moved to match such an angle.

The filter stacks 606 and 608 may be part of a near-eye display system assembly for an HMD device. For example, the stacks 606 and 608 along with lens 610 and display panel 604 can be housed in a head-mounted display device worn by a user. The filter stacks 606 and 608 may be pieces of one or more optical assemblies that can provide image content to each of a left and right eyepiece in the HMD device. The flat filter stack 606 may be operable to be oriented in a first direction (e.g., from zero to about 12.5 degrees toward an eyepiece in an HMD device). The filter stack 606 may include at least one surface coated with a flat beam splitting layer. The beam splitting layer may be faced away from display panel 604 and toward filter stack 608. The flat filter stack 608 may be operable to be oriented in a second direction (e.g., from zero to about 12.5 degrees toward an eyepiece in an HMD device).

In some implementations, the filter stack 606 may be bonded directly to the display panel 604 to provide zero degree filter angles. In some implementations, the filter stack 608 may be bonded directly to the display panel 604 to provide zero degree filter angles.

In some implementations, the filter stack 606 may be adapted to be oriented in the first direction at an angle from about zero to about 12.5 degrees from the normal direction to the plane of the display panel. The flat filter stack 608 may be adapted to be tilted in the second direction at an angle from about zero to about 12.5 degrees from the normal direction to the plane of the display panel. One or both reorientations/tilts may occur in response to tilting the display panel from about zero to about 25 degrees from the normal direction to the plane of a bottom edge of the head-mounted display device such that the display panel is seated perpendicular to the optical axis of the near eye display system.

The selected first and second angles may pertain to one another and may be selected based on an angle that the display panel is tilted. In one example, the display 604 is tilted and housed in the HMD device at an angle selected by a user. The display panel may be adapted to be oriented in the second direction, for example.

In general, tilting the display panel 604 may include seating the display panel 604 within and perpendicular to a base of the HMD device and angling a top edge of the display panel 604 toward the optical assembly (i.e., toward either or both of filter stack 606 and 608) corresponding to each of the left and right eyepiece. In general, the optical assembly includes at least one fixed lens for each of the left and right eyepiece. In some implementations, the at least one fixed lens for each of the left and right eyepiece is disposed in the HMD device adjacent to the flat filter stack 608 and adapted to receive image content originating at the image projecting device and through the optical assembly toward the flat filter stack 608.

In some implementations, tilting the display panel 604 may result in modifying a field of view of the near-eye display system by moving image artifacts outside of the field of view. Such a modification can function to ensure that ghost images, created by stray light within the optical assembly, can be comfortably out of the line of sight of a user wearing the HMD device. The display panel 604 may additionally be tilted to maintain image plane focus for a user wearing the HMD device.

In some implementations, the filter stacks 406 and 410 are adapted to maintain a relationship to one another in order to maintain an optical axis perpendicular to the object plane to keep the optical system on-axis. For example, in system 400, the tilt angle of the display panel may be twice a relative tilt angle between the two flat filters. In one non-limiting example, the filter stacks 406 and 410 may be adapted to be tilted from zero to about 12.5 degrees in response to tilting the display panel 604 from about zero to about 25 degrees.

Figure 7:
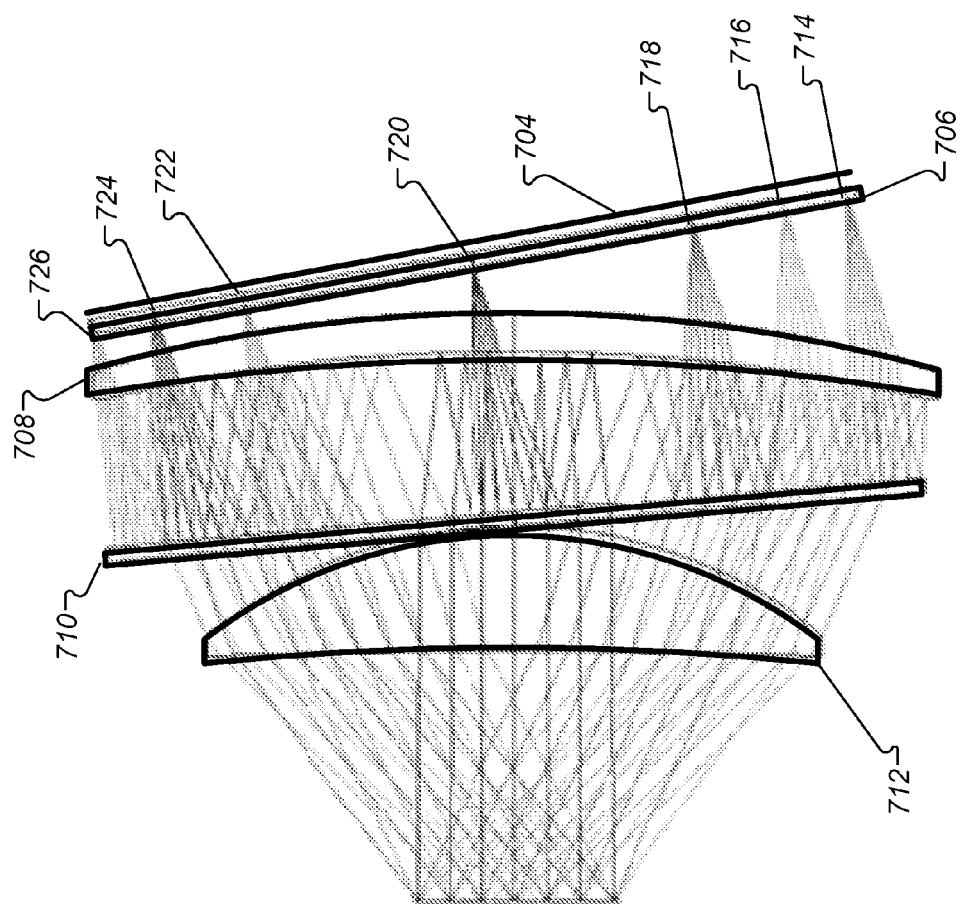
FIG. 7 is a block diagram of another variably tilted optical assembly.
Figure 7:

FIG. 7 is a block diagram of another variably tilted optical assembly 700. Optical assembly 700 may include components described with respect to FIGS. 4 and 5. As such, optical assembly 700 may provide examples pertaining to a tilt-able optical assembly 400.

As shown in FIG. 7, an eye 702 of a user is simulated to the left of the optical assembly 700, while a display 704 is shown to the right of the optical assembly 700. The optical assembly 700 includes a first flat filter stack 706, a curved lens 708, a second flat filter stack 710, and a lens 712. The optical assembly 700 can function to fold the optical path of light presented by display 704 and through the filter stacks 706 and 710, and curved lens 708. In this example, example folded optical paths are shown by paths 714, 716, 718, 720, 722, 724, and 726. In some implementations, the optical assembly 700 may be telecentric when the average angle of ray bundles on the display surface is close to perpendicular.

The optical assembly 700 pertains to the hybrid optical assemblies described here. These assemblies may include tilted-image variants. The curved lens 708 may be composed of plastic and coated with a beam splitter layer. The optical assembly 700 may be housed in an HMD device. The HMD device may include at least one of optical assembly 700. Optical assembly 700 can, for example, include a curved beam splitter device disposed between a first filter stack and a second filter stack. The optical assembly may also include a removable image projecting device adapted to be seated at a number of different angles within the HMD device. In some implementations, the display panels seated between the image projecting device and the first filter stack may be seated at a number of different angles within the HMD device in response to tilting the first filter stack or the second filter stack.

In some implementations, the optical assembly 700 may be configurable to balance a field of curvature in response to tilting the first filter stack or the second filter stack. In system 700, there may be no particular set relationship between filter stacks. The tilt relationship may depend on variables including, but not limited to the curvature of the surface with the beam splitter coating, the location of beam splitter, the location of the filter stacks, etc.

In an example, at least one display panel may be seated at an angle selected based on an orientation associated with the first filter stack or the second filter stack. The orientation may include a tilting of more than about 5 degrees and less than about 25 degrees of a vertical offset from an optical axis of the lens. In some implementations, tilting the first filter stack or the second filter stack results in modifying a field of view associated with the head-mounted display housing, the modification including moving image artifacts outside of the field of view.

In some implementations, the HMD device may include two optical assemblies, each configured to provide image content to the lens in corresponding left and right eyepieces associated with the HMD device. For example, each optical assembly may be configured to provide image content through separate left and right eye lenses. In some implementations, the lenses are adapted to maintain image magnification and focus in response to detecting movement of at least one of the optical assemblies. For example, if one or both stacks in an optical assembly movies, the lens associated with such stacks can accommodate the movement without loss of image magnification and focus level. In some implementations, the optical assembly 700 includes a number of optical elements disposed between the first filter stack and the second filter stack. The optical elements may be configured to decrease optical aberrations.

Figure 8:
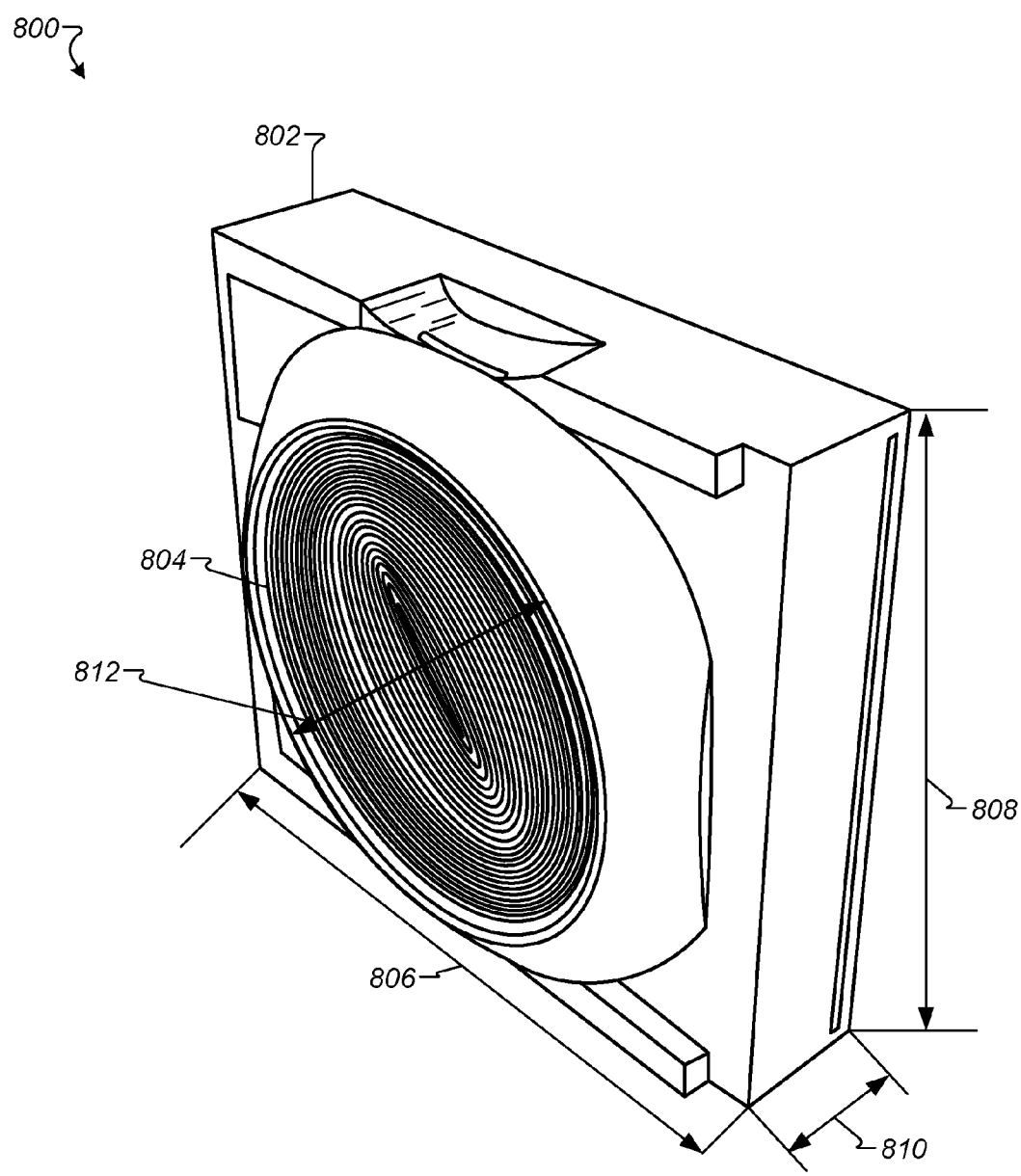
FIG. 8 is an example packaged optical assembly for housing the optical assemblies described herein.

FIG. 8 is an example packaged optical assembly 800 for housing the optical assemblies described herein. The optical assembly 800 includes a housing 802 with a lens 804 seated within the housing. The internal components of packaged assembly 800 may include the combination of components shown in FIG. 3 or FIG. 5 or the tilted variations of such components. Example dimensions of the assembly 800 include a width 806 of about 2 to about 3 inches and a length 808 of about 2 to about 3 inches. The depth 810 of the assembly 800 may be about one to about 2.5 inches.

In some implementations, exact depth can vary based on including or not including particular filter layers, as described throughout this disclosure. In some implementations, two of the assembly 800 may be fitted into an HMD device, each inserted to provide filtering and optics to each of a left and right eyepiece in the HMD display.

The lens 804 may be a refracting lens or other lens configurable to provide high-performance focus and magnification for a HMD device. In some implementations, the housing 800 may be designed to fit multiple lenses or a lens array instead of single lens 804.

In some implementations, the lens 804 may have a diameter 812 of about 1 to about 1.5 inches. In some implementations, the lens 804 may have a diameter 812 of about 1.5 inches to about 2.5 inches. In yet other implementations, the lens 804 may have a diameter 812 of about 1 inch to about 2 inches.

Although the depicted assembly 800 is depicted square with possible modifications to make a rectangular shaped assembly, other shapes are possible. For example, the filter stacks described herein can be made to fit a circularly shaped housing intended for seating into the HMD device. In some implementations, the filter stacks described herein can be made to fit an angular-sided assembly including, but not limited to a triangle, a rhombus, a hexagon, an octagon, etc.

Figure 9:
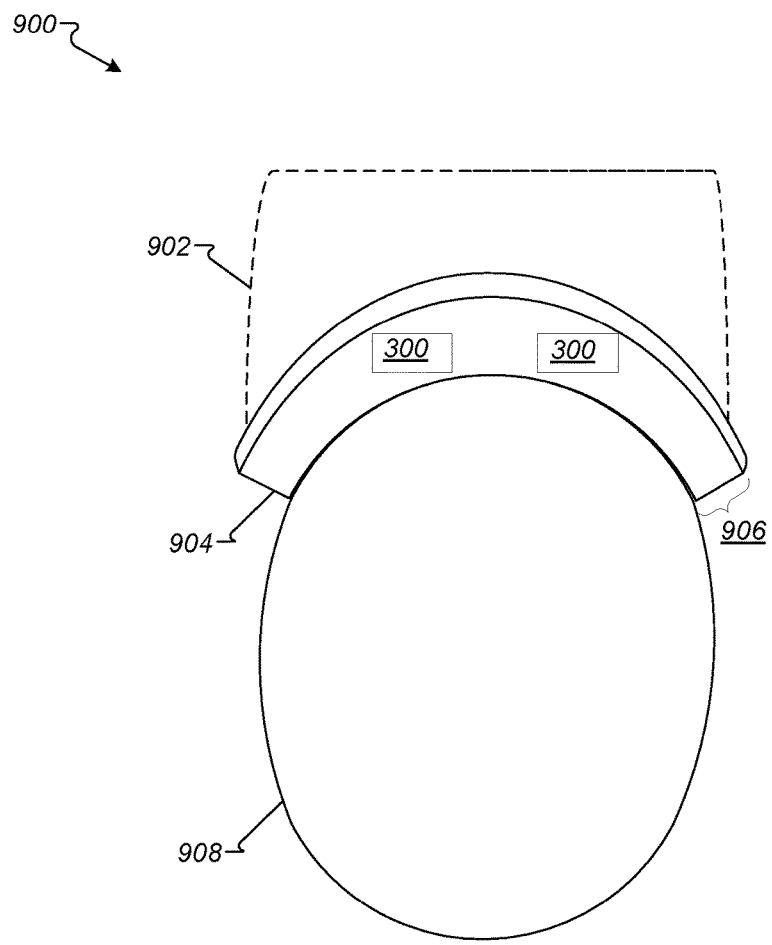
FIG. 9 is an example of a top down view of a packaged HMD device capable of housing optical assemblies described herein.

FIG. 9 is an example of a top down view 900 of a packaged HMD device 904 capable of housing one or more of the optical assemblies described herein. The HMD device 904 can be fitted with a mobile computing device (i.e., mobile phone) adapted to playback movie content, virtual reality content, or other curated content displayable on the screen of the mobile computing device. In general, HMD devices can take advantage of mobile phone display technologies, which provide high-resolution, sizing of two to about three inches wide per channel at a focal lens length of about 35 millimeters to about 45 millimeters, as shown by typical HMD size at dotted line 902. The HMD device 904 can provide additional advantages by using one or more of the optical assemblies described herein (e.g., optical assemblies shown in FIGS. 1-11). Using such optical assemblies, the HMD device 904 can effectively reduce the focal length of the lens from a typical length (i.e., about 30-50 millimeters) to about 12 to about 25 millimeters, as shown by thickness 906. This can provide the advantage of being able to shrink the HMD device including allowing manufacturers to design a stream-lined device that a user 908 can fit closer to her face. In some implementations, the optical assemblies described herein can reduce the lens display space up to about 67 percent from typical HMD devices. Such a reduction can provide advantages such as moving the HMD device center of gravity closer to the head of the user, reducing the moment of inertia, and providing a compact, appealing-looking virtual reality HMD device, such as device 904. In one example implementation, the HMD device may be reduced in profile between about 15 and 25 millimeters based on the reduced focal length.

To avoid having to design a short focal length magnifier while reducing the HMD device thickness/profile/focal length, the optical assemblies described herein can employ two flat polarization filter stacks to fold the optical path between a long focal length magnifying lens and the display panel. The optical assemblies described herein can be provided for each eye. In general, the flat filter stacks described throughout this disclosure do not provide optical magnification, and are thin such that the stacks contribute minimally to optical aberrations.

Figure 10:
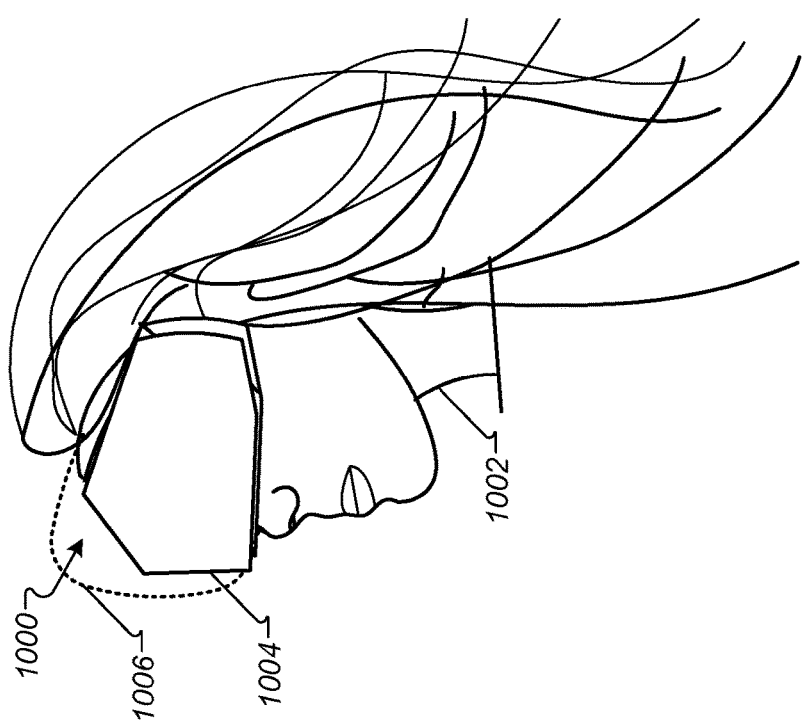
FIG. 10 is an example of a packaged HMD device capable of housing an optical assembly in accordance with an embodiment described herein.

FIG. 10 is an example of a packaged HMD device 1000 capable of housing the optical assemblies described herein. The HMD device 1000 can be fitted with a mobile computing device (i.e., mobile phone) adapted to playback movie content, virtual content, or other curated content displayable on the screen of the mobile computing device.

In one non-limiting example, the HMD device 1000 can be fitted with at least two optical assemblies, for example, one assembly for each eyepiece of the HMD device 1000. In one example arrangement, the optical assemblies can include a first and second filter stack, at least one refracting lens, and a display panel. The first filter stack may be adjacent and/or attached on a first side to a display panel that receives light from the mobile computing device. The first filter stack may include a first linear polarizer nearest the display panel and a first quarter wave panel attached to the linear polarizer. The side of the linear polarizer not attached to the first quarter wave panel may be coated with a beam splitter layer. A second filter stack may be adjacent and/or attached on the beam splitter layer to the second filter stack. The second filter stack may include a second quarter wave plate attached or adjacent to the beam splitter layer on a first side and attached to a polarizing beam splitter on the second side. The polarizing beam splitter may be attached to a first side of a second linear polarizer. The second side of the second liner polarizer may be attached or adjacent to the at least one refracting lens or lens array.

In another example, the optical assemblies may include a first filter stack coupled to a second filter stack and configured into a stacked arrangement with other components. One such example of a stacked arrangement may include a first linear polarizer that is adjacent to a display panel and after a first quarter wave plate. The first quarter wave plate is stacked after a curved lens functioning as a beam splitter, which is stacked after a second quarter wave plate. The second quarter wave plate is stacked after a polarizing beam splitter, which is stacked after a second linear polarizer. The second linear polarizer is adjacent to the at least one lens or lens array.

As shown in FIG. 10, the user 1002 may be wearing HMD device 1000 and accessing content. The front profile 1004 may be fitted closer to the head of the user 1002 because slim optical assemblies described herein can be fitted within the smaller housing of HMD 1000. A dotted line 1006 depicts a typical HMD housing profile.

The HMD device 1000 may be low-profile and adapted to reduce a focal length by using optical assemblies 200 or 400 within the device, for example. The filter stacks utilized in such assemblies can be flat and adapted to fold the optical path between a long focal length magnifying lens and a display panel.

Figure 11:
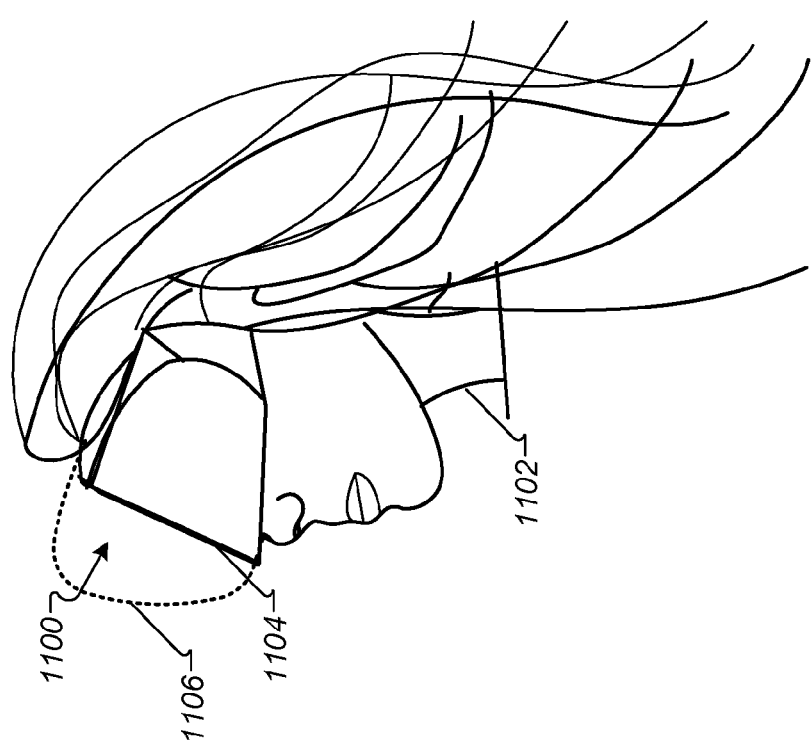
FIG. 11 is an example of a packaged HMD device capable of housing an optical assembly in accordance with an embodiment described herein.

FIG. 11 is an example of a packaged HMD device 1100 capable of housing the optical assemblies described herein. Similar to the above examples, the HMD device 1100 can be fitted with a mobile computing device (i.e., mobile phone) adapted to playback movie content, virtual content, or other curated content displayable on the screen of the mobile computing device. In one non-limiting example, the HMD device 1100 can be fitted with at least two optical assemblies, for example, one assembly for each eyepiece of the HMD device 1100. In some implementations, the optical assemblies may be particularly designed to be tilt-able, and thus a front panel 1104 may be designed with a backward tilt toward a forehead area of a user 1102.

As shown in FIG. 11, the user 1102 may be wearing HMD device 1100 and accessing content. The HMD device 1100 may be low-profile and tilted as shown by front facing 1104 in order to reduce a focal length by using optical assemblies 600 or 700 within the device, for example. A dotted line 1106 depicts a typical HMD housing profile. The filter stacks utilized in such assemblies can be flat and adapted to fold the optical path between a long focal length magnifying lens and a display panel. The lens display space may be about 13 millimeters to about 20 millimeters.

In one example, the optical assemblies can include a first and second filter stack, at least one refracting lens, and a display panel. In one example arrangement, the first filter stack may be adjacent and/or attached on a first side to a display panel that receives light from the mobile computing device. The first filter stack may include a first linear polarizer nearest the display panel and a first quarter wave panel attached to the linear polarizer. The side of the linear polarizer not attached to the first quarter wave panel may be coated with a beam splitter layer. A second filter stack may be adjacent and/or attached on the beam splitter layer to the second filter stack. The second filter stack may include a second quarter wave plate attached or adjacent to the beam splitter layer on a first side and attached to a polarizing beam splitter on the second side. The polarizing beam splitter may be attached to a first side of a second linear polarizer. The second side of the second liner polarizer may be attached or adjacent to the at least one refracting lens or lens array.

In another example, the optical assemblies may include a first filter stack coupled to a second filter stack and configured into a stacked arrangement with other components. One such example of a stacked arrangement may include the first filter stack that includes a first linear polarizer stacked between a display panel and a first quarter wave plate. The first quarter wave plate may be stacked between the first linear polarizer and a beam splitter. The second filter stack may include a polarizing beam splitter stacked between a second quarter wave plate stacked after the beam splitter and a polarizing beam splitter. The polarizing beam splitter may be stacked between the second quarter wave plate and a second linear polarizer. The second linear polarizer may be adjacent to at least one refracting lens or lens array.

Figure 12:
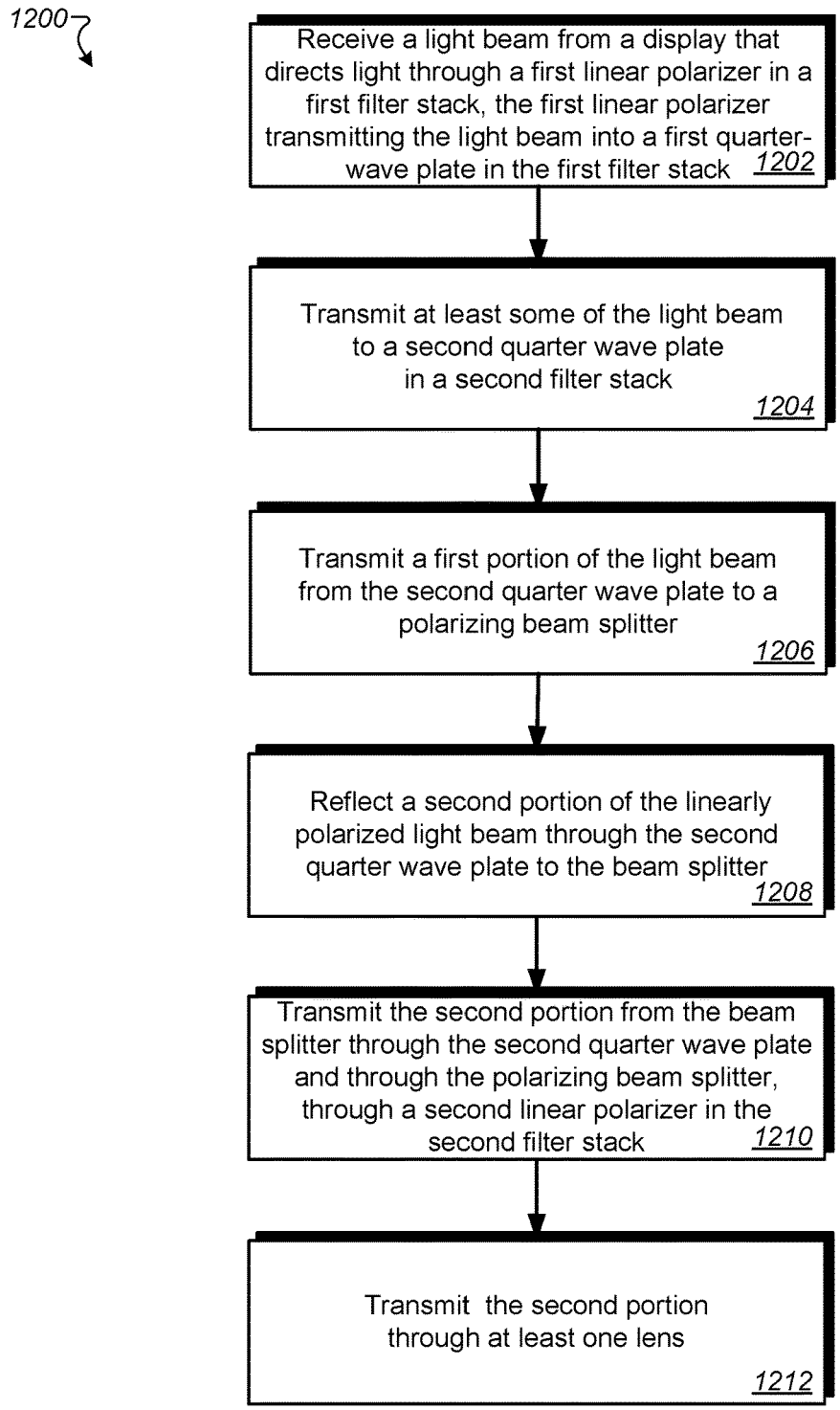
FIG. 12 is a flow chart diagramming one embodiment of a process for use with the optical assemblies described herein.

FIG. 12 is a flow chart diagramming one embodiment of a process 1200 for use with the optical assemblies described herein. The process 1200 may include filtering light for a near-eye display system in an HMD device. The optical assemblies may include a first filter stack and a second filter stack that are flat, non-curved elements, which do not provide optical magnification.

The process 1200 may include receiving 1202 a light beam at a display panel and from a display that directs light through a first linear polarizer in a first filter stack. For example, the display panel may be disposed within an HMD device to receive image content from a mobile computing device (or from content stored on a processor associated with the HMD device). The first linear polarizer may transmit the light beam into a first quarter-wave plate (also in the first filter stack). The light beam may become circularly polarized in a first direction and further transmitted through a beam splitter (in the first filter stack). The beam splitter may be operable to transmit (1204) at least some of the light beam to a second quarter wave plate in a second filter stack. In some implementations, the beam splitter includes a partial-mirror coating on the first filter stack and performs with a beam splitting ratio of about 50 percent. In some implementations, the beam splitter may have a maximum transmission of about 25 percent of the light (transmitted from the beam splitter to the display) if the display is linearly polarized. In the event that the display is unpolarized, the light may be transmitted with a maximum transmission of about 12.5 percent (transmitted from the beam splitter to the display) if the display is unpolarized.

The process 1200 may include transmitting (1206) a first portion of the light beam from the second quarter wave plate to a polarizing beam splitter (in the second filter stack) in order to transform the first portion into a linearly polarized light beam. In some implementations, the polarizing beam splitter is operable to reflect (1208) a second portion of the linearly polarized light beam through the second quarter wave plate back to the beam splitter. In such an example, the second portion may become circularly polarized in a second direction after reflecting off of the beam splitter. In such an example, the first direction may be a right hand circularly polarized (RHCP) and the second direction may be left hand circularly polarized (LHCP).

The process 1200 may include transmitting (1210) the second portion from the beam splitter through the second quarter wave plate and through the polarizing beam splitter and through a second linear polarizer in the second filter stack. In addition, the process 1200 may include transmitting (1212) the second portion through at least one lens to provide a refracted image to an eyepiece of the near-eye display system.

In some implementations, the first portion of the light beam is orthogonal to a passing state of the polarizing beam splitter and the second portion of the light beam is parallel to the passing state of the polarizing beam splitter. In some implementations, at least some of the light beam from the display is passed into the first quarter wave plate from the first linear polarizer, wherein the first quarter wave plate is seated at about 45 degrees off a vertical in which the vertical corresponds to a longitudinal edge of the first filter stack.

In some implementations, the axes of the first linear polarizer and the second linear polarizer are orthogonal and the axes of the first quarter wave plate and the second quarter wave plate are orthogonal.

In some implementations, the display is an emissive display and comprises an organic light emitting diode (OLED) display. In some implementations, the display is a non-emissive display and comprises a liquid crystal display (LCD) display.

Figure 13:
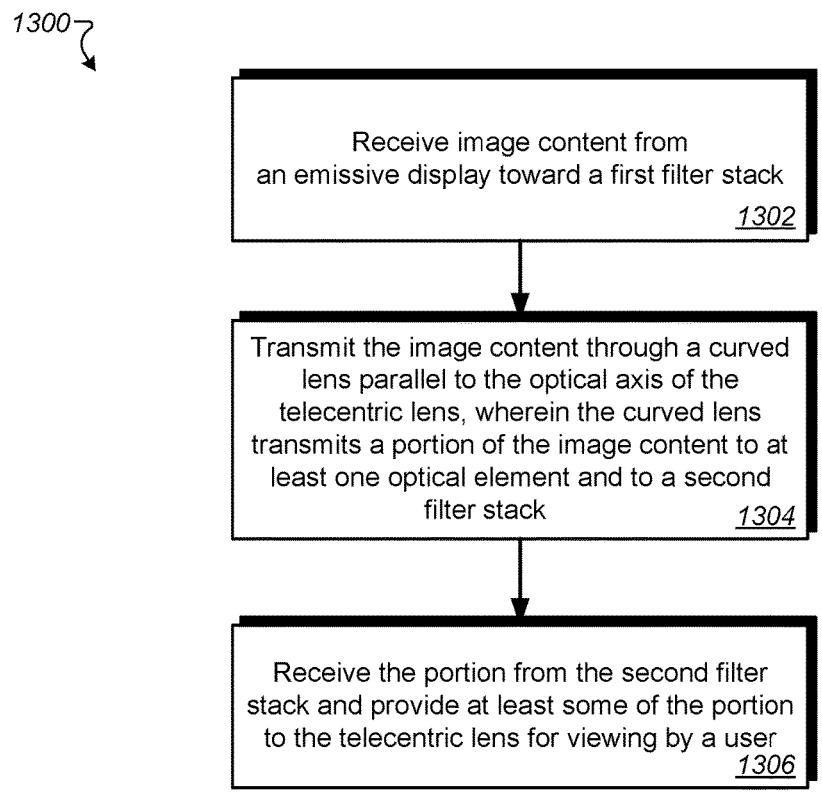
FIG. 13 is a flow chart diagramming one embodiment of a process for use with the optical assemblies described herein.

FIG. 13 is a flow chart diagramming one embodiment of a process 1300 for use with the optical assemblies described herein. The process 1300 may include receiving (1302) image content from an emissive display toward a first filter stack. In this example, the first filter stack is adapted to be oriented in a first direction from the optical axis of a first lens. In some implementations, the first filter stack may be tilted toward the first lens.

The process 1300 may include transmitting (1304) the image content through a curved lens parallel to the optical axis of the first lens. The curved lens may transmit a portion of the image content to at least one optical element and to a second filter stack. The second filter stack may be adapted to be oriented in a second direction from the optical axis of the first lens. In one example, the first direction includes about 5 to about 13 degrees off of a vertical offset from the optical axis of the first lens (and toward the first lens) while a second direction includes about zero to about 5 degrees off of the vertical offset from the optical axis of the first lens (and away from the first lens). In one example, the first filter stack may be tilted toward an eyepiece in the HMD device at about 3 degrees while the second filter stack is also tilted toward the eyepiece in the HMD device at about 3 degrees. In another example, the first filter stack may be tilted toward an eyepiece in the HMD device at about 5 degrees while the second filter stack is tilted toward the eyepiece in the HMD device at about 10 degrees. In another example, the first filter stack may be tilted toward an eyepiece in the HMD device at about 13 degrees while the second filter stack is tilted toward the eyepiece in the HMD device at about 10 degrees. In another example, the first filter stack may be tilted toward an eyepiece in the HMD device at about 10 degrees while the second filter stack is also tilted toward the eyepiece in the HMD device at about 10 degrees. In yet another example, the first filter stack may be tilted away from an eyepiece in the HMD device at about 2 degrees while the second filter stack is tilted toward the eyepiece in the HMD device at about 2 degrees.

The process 1300 may include receiving (1306) the portion from the second filter stack and providing at least some of the portion to the first lens for viewing by a user. The portion changes polarized handedness from right hand circularly polarized to left hand circularly polarized upon passing through the curved lens and the at least one optical element.

In some implementations, the first filter stack and the second filter stack are parallel to the first lens and the curved lens. The first lens may be aligned on an axis common to the curved lens and the emissive display.

In some implementations, the curved lens is composed of plastic and coated with a beam splitter layer. The beam splitter layer may include a positive mirror surface configured to resolve display pixels.

In some implementations, the process 1300 may further include an optical assembly that includes the first filter stack having a first linear polarizer coupled to a first quarter wave plate. The optical assembly may also include the second filter stack having a second quarter wave plate coupled to a polarizing beam splitter that is coupled to a second linear polarizer. The optical assembly may also include the curved lens having a plastic lens with a beam splitter coating. The curved lens may be disposed between the first filter stack and the second filter stack.

Figure 14:
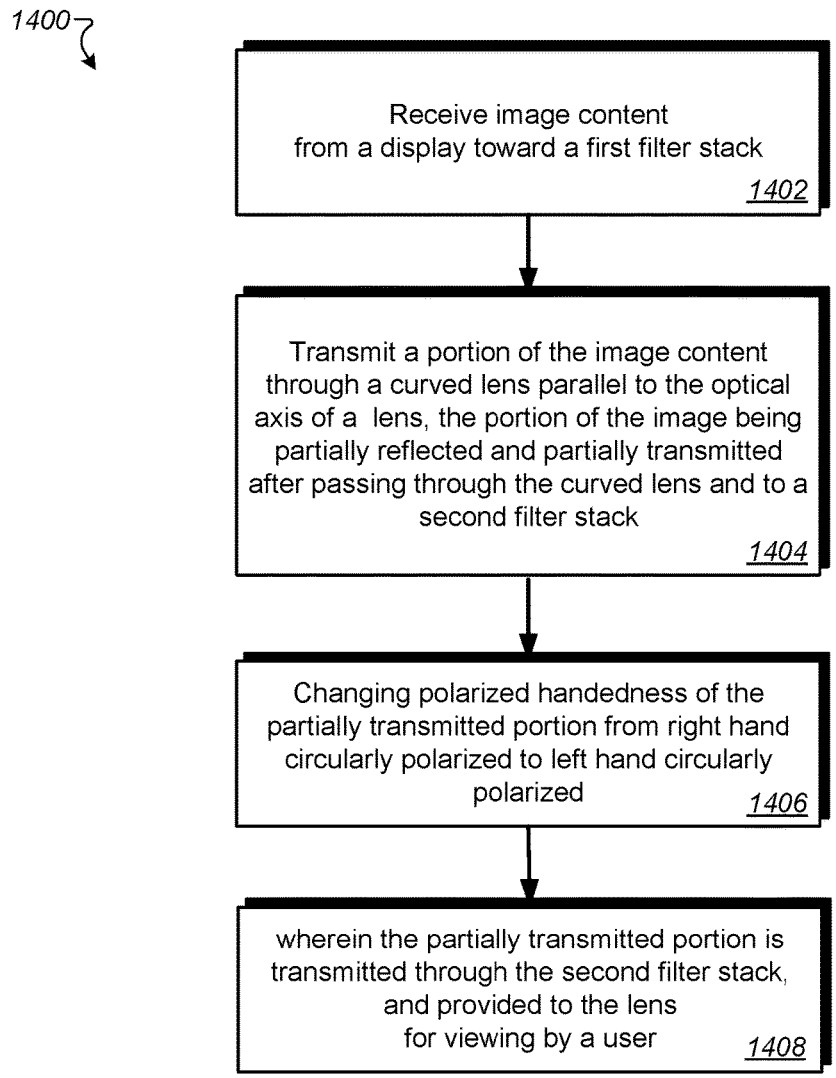
FIG. 14 is a flow chart diagramming one embodiment of a process for use with the optical assemblies described herein.

FIG. 14 is a flow chart diagramming one embodiment of a process 1400 for use with the optical assemblies described herein. The optical assemblies include at least a first filter stack, a second filter stack, a lens, and a display panel. The first filter stack and the second filter stack may be flat, non-curved elements. The first filter stack and the second filter stack may be parallel to the lens and the curved lens and the lens may be aligned on an axis common to the curved lens and the display. The curved lens may be composed of plastic and coated with a beam-splitting layer including a positive mirror surface configured to resolve display pixels.

The process 1400 may include receiving (1402) image content from a display toward a first filter stack and transmitting (1404) a portion of the image content through a curved lens parallel to the optical axis of a lens. The portion of the image may be partially reflected and partially transmitted after passing through the curved lens and to a second filter stack. The partially transmitted portion may change (1406) polarized handedness from right hand circularly polarized to left hand circularly polarized during transmission. The partially transmitted portion may be transmitted (1408) through the second filter stack and provided to the lens for viewing by a user.

In some implementations, the process 1400 may include optical assemblies in which the first filter stack includes a first linear polarizer coupled to a first quarter wave plate, the second filter stack includes a second quarter wave plate coupled to a polarizing beam splitter that is coupled to a second linear polarizer, and the curved lens includes a plastic lens with a beam splitter coating. The curved lens may be disposed between the first filter stack and the second filter stack.

In some implementations, the HMD devices described throughout this disclosure 1000 may be adapted to include or house an emissive display such as a Cathode Ray Tube (CRT), a Field emission display (FED), a Surface-conduction Electron-emitter Display (SED), a Vacuum Fluorescent Display (VFD), an Electroluminescent Displays (ELD), a Light-Emitting Diode Displays (LED), a Plasma Display Panel (PDP), an Electrochemical Display (ECD), a liquid crystal on silicon (LCOS), or an Organic Light Emitting Diode (OLED). In some implementations, the HMD device 102 may be adapted to include non-emissive displays including an LCD device with light sources being RGB, LED, or white LED.

In particular implementations, the systems and methods described herein can include one or more optical assemblies ranging from about 2 to about 3 inches both width and length and from about 1 to about 3 inches in depth. Other variations are possible.

Example Filter Stack Assemblies

Example filter stack assemblies are shown below. Although specific dimensions and layers are provided, other variations in such dimension are possible. In general, the filter stacks described herein are thin enough that very little image degradation occurs. In addition, magnification lenses may suffice without redesigning or readjusting based on different levels of tilting in the versions that provide tilt-able components.

A first example filter stack is shown below as Example Filter Stack I. The example filter stack includes a substrate/cover glass layer that may include an affixed beam splitter or a free standing beam splitter. In some implementations, the beam splitter may be a coating on the quarter wave plate. The example filter stack also includes the quarter wave plate adhered with pressure-sensitive adhesive to a linear polarizer, which can be adhered to a substrate or cover glass layer. The example thickness are shown below for each component with a final first filter stack (e.g., filter stack 206) having an assembled thickness of about 1.243 millimeters. In some implementations, filter stack 206 includes a substrate/cover glass (Row 1 below) with a beam splitter coating and a second substrate/cover glass (Row 7 below) with an antireflective coating.

| # | Layer | Comment | Thickness (mm) |
|---|---|---|---|
| 1 | B270/D263 Glass/BS | Substrate/Cover glass & Beam splitter Coating | 0.21 |
| 2 | PSA | Pressure-sensitive adhesive | 0.025 |
| 3 | QWP | Quarter waveplate film | 0.073 |
| 4 | PSA | Pressure-sensitive adhesive | 0.025 |
| 5 | LP | Linear polarizer film | 0.185 |
| 6 | PSA | Pressure-sensitive adhesive | 0.025 |
| 7 | B270/D263 Glass | Substrate/Cover glass & Coating | 0.7 |
| | | | = 1.243 |

Example Filter Stack I

A second example filter stack is shown below as Example Filter Stack II. The example filter stack includes a substrate/cover glass layer that may include a linear polarizer film adhered with pressure-sensitive adhesive to a wiregrid polarization beam splitting film. The beam splitting film may be adhered in the same manner to a quarter wave plate film. The quarter wave plate may be adhered to a linear polarizer, which can be adhered to a substrate or cover glass layer. The example thicknesses are shown below for each component with a final second filter stack (e.g., filter stack 208) having a thickness of about 1.458 millimeters. In some implementations, the filter stack 208 includes substrate/cover glass layers that have an antireflective coating (i.e., in both Rows 1 and 9 below).

| # | Layer | Comment | Thickness (mm) |
|---|---|---|---|
| 1 | B270/D263 Glass | Substrate/Cover glass & Coating | 0.7 |
| 2 | PSA | Pressure-sensitive adhesive | 0.025 |
| 3 | LP | Linear polarizer film | 0.185 |
| 4 | PSA | Pressure-sensitive adhesive | 0.025 |
| 5 | WGF | Wiregrid Polarization Beam splitting film | 0.19 |
| 6 | PSA | Pressure-sensitive adhesive | 0.025 |
| 7 | QWP | Quarter waveplate film | 0.073 |
| 8 | PSA | Pressure-sensitive adhesive | 0.025 |
| 9 | B270/D263 Glass | Substrate/Cover glass & Coating | 0.21 |
| | | | = 1.458 |

Example Filter Stack II

A third example filter stack is shown below as Example Filter Stack III. The example filter stack may be stacked near or adjacent to a curved beam splitter and/or lens. That is, the curved beam splitter may be a free standing beam splitter. The filter stack may include a quarter wave plate film adhered to a linear polarizing film that is adhered on the opposite side to a substrate/cover glass layer. The layers may be adhered with pressure-sensitive adhesive, or by another method. The example thickness are shown below for each component with a final first filter stack (e.g., filter stack 406) having an assembled thickness of about 1.848 millimeters. In some implementations, the filter stack 406 includes substrate/cover glass layers that have an antireflective coating (i.e., in both Rows 1 and 7 below).

| # | Layer | Comment | Thickness (mm) |
|---|---|---|---|
| 1 | B270/D263 Glass | Substrate/Cover glass & Coating | 0.5 |
| 2 | CBS | Curved Beam Splitter/Lens | 0.34 |
| 3 | QWP | Quarter waveplate film | 0.073 |
| 4 | PSA | Pressure-sensitive adhesive | 0.025 |
| 5 | LP | Linear polarizer film | 0.185 |
| 6 | PSA | Pressure-sensitive adhesive | 0.025 |
| 7 | B270/D263 Glass | Substrate/Cover glass | 0.7 |
|   |   |   | = 1.848 |

Example Filter Stack III

A fourth example filter stack is shown below as Example Filter Stack IV. The example filter stack includes a substrate/cover glass layer that may include a linear polarizer film adhered with pressure-sensitive adhesive to a wiregrid polarization beam splitting film. The beam splitting film may be adhered in the same manner to a quarter wave plate film. The quarter wave plate may be adhered to a linear polarizer, which can be adhered to a substrate or cover glass layer. A beam splitter (e.g., lens 408) may be inserted between Example Filter Stack III and Example Filter Stack IV. The example thicknesses are shown below for each component with a final second filter stack (e.g., filter stack 410) having a thickness of about 1.458 millimeters. In some implementations, the filter stack 410 includes substrate/cover glass layers that have an antireflective coating (i.e., in both Rows 1 and 9 below).

| # | Layer | Comment | Thickness (mm) |
|---|---|---|---|
| 1 | B270/D263 Glass | Substrate/Cover glass | 0.7 |
| 2 | PSA | Pressure-sensitive adhesive | 0.025 |
| 3 | LP | Linear polarizer film | 0.185 |
| 4 | PSA | Pressure-sensitive adhesive | 0.025 |
| 5 | WGF | Wiregrid Polarization Beam splitting film | 0.19 |
| 6 | PSA | Pressure-sensitive adhesive | 0.025 |
| 7 | QWP | Quarter waveplate film | 0.073 |
| 8 | PSA | Pressure-sensitive adhesive | 0.025 |
| 9 | B270/D263 Glass | Substrate/Cover glass | 0.21 |
|   |   |   | = 1.458 |

Example Filter Stack IV

In any of the filter stacks described herein, the polarizer layer/film (e.g., LP) may be outside of a filter stack. For example, the polarizer layer may be laminated on or within a display module. If for example, the display includes a polarizer layer (i.e., as in a pre-polarized display), the polarizer layer is not needed.

As used herein, and unless the context dictates otherwise, any discussion of tilting, orienting, or direction with respect to components described in this disclosure generally pertains to moving said component from a normal direction to the plane of a vertically placed component within an HMD device, for example. Namely, moving components described in this manner can pertain to moving the component with respect to the optical axis of particular lenses used in the assemblies.

As used herein, and unless the context dictates otherwise, the term "coupled to" is intended to include both direct coupling (in which two elements that are coupled to each other contact each other) and indirect coupling (in which at least one additional element (including airgap) is located between the two elements).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A near-eye display system assembly comprising:
a head-mounted display device including an image projecting device and an optical assembly, the optical assembly including for each of a first eyepiece and a second eyepiece,
at least one lens;
a first flat filter stack including at least one surface coated with a flat beam splitting layer;
a second flat filter stack stacked between the at least one lens and the first flat filter stack; and
a display panel adapted to receive image content from the image projecting device,
wherein each display panel is tilted from a non-zero tilt of a normal direction of the respective display panel to a first angle with an optical axis of the at least one lens, and each respective first flat filter stack is tilted from a non-zero tilt of a normal direction of each respective first flat filter stack to a second angle with the optical axis of the at least one lens, the first angle being different than the second angle.

2. The system of claim 1, wherein the first flat filter stack is adjacent to the second flat filter stack and configured into a stacked arrangement, wherein:
the first flat filter stack includes a first linear polarizer stacked between the display panel and a first quarter wave plate, the first quarter wave plate stacked between the first linear polarizer and a beam splitter; and
the second flat filter stack includes a polarizing beam splitter stacked between a second quarter wave plate and a second linear polarizer,
wherein the second linear polarizer is adjacent to the at least one lens.

3. The system of claim 1, wherein the display panel of each eyepiece is configured to be positioned adjacent to the focal point of the optical assembly to form a virtual image for display on the display panel of each respective eyepiece to modify a field of view of the near-eye display system.

4. The system of claim 1, wherein the at least one lens for each respective eyepiece is fixed and disposed in the head-mounted display device adjacent to the second flat filter stack and adapted to receive image content originating at the image projecting device and through the optical assembly toward the second flat filter stack of each respective eyepiece.

5. The system of claim 1, wherein the first angle is up to 12.5 degrees from a non-zero tilt of the normal direction of the respective display panel, and the second angle is up to 25 degrees from the non-zero tilt of the normal direction of the respective first flat filter stack,
wherein the tilt of the respective display panels provides increased spacing between at least one edge of each respective display panel for fitting the near-eye display system assembly to a user.

6. A method of filtering light for a near-eye display system, the method comprising:
receiving a light beam at a display panel and from a display that directs light through a first linear polarizer in a first filter stack, the first linear polarizer transmitting the light beam into a first quarter-wave plate in the first filter stack, the light beam becoming circularly polarized in a first direction and being further transmitted through a beam splitter in the first filter stack, the beam splitter operable to transmit at least some of the light beam to a second quarter wave plate in a second filter stack;
transmitting a first portion of the light beam from the second quarter wave plate to a polarizing beam splitter in the second filter stack to transform the first portion into a linearly polarized light beam, wherein the polarizing beam splitter is operable to reflect a second portion of the linearly polarized light beam through the second quarter wave plate to the beam splitter, the second portion becoming circularly polarized in a second direction after reflecting off of the beam splitter; and
transmitting the second portion from the beam splitter through the second quarter wave plate and through the polarizing beam splitter, through a second linear polarizer in the second filter stack, and through at least one lens to provide a refracted image to an eyepiece of the near-eye display system,
wherein the display panel and second filter stack are arranged in parallel and tilted from a normal to the optical axis of the at least one lens to adjust focus for the near-eye display system.

7. The method of claim 6, wherein the first portion of the light beam is orthogonal to a passing state of the polarizing beam splitter, and wherein the second portion of the light beam is parallel to the passing state of the polarizing beam splitter.

8. The method of claim 6, wherein the first direction includes right hand circularly polarized and the second direction includes left hand circularly polarized.

9. The method of claim 6, wherein at least some of the light beam from the display is passed into the first quarter wave plate from the first linear polarizer, wherein the first quarter wave plate is seated at about 45 degrees off of a vertical, the vertical corresponding to a longitudinal edge of the first filter stack.

10. The method of claim 6, wherein the first filter stack and the second filter stack are flat, non-curved elements.

11. The method of claim 6, wherein axes of the first linear polarizer and the second linear polarizer are orthogonal, and wherein axes of the first quarter wave plate and the second quarter wave plate are orthogonal.

12. The method of claim 6, wherein the first filter stack and second filter stack do not provide optical magnification.

13. The method of claim 6, wherein the beam splitter comprises a partial-mirror coating on the first filter stack and performs a beam splitting ratio of about 50 percent, and wherein about 25 percent of the second portion is transmitted from the beam splitter to the display if the display is linearly polarized, and about 12.5 percent of the second portion is transmitted from the beam splitter to the display if the display is unpolarized.

14. A system comprising:
an interactive head-mounted display device adapted to house an image projecting device and an optical assembly, the optical assembly including, for a first eyepiece and a second eyepiece,
at least one refracting lens;
a first flat filter stack including at least one surface coated with a flat beam splitting layer;
a second flat filter stack stacked between the at least one lens the first flat filter stack; and
a display panel adapted to receive image content from the image projecting device; and
at least one processor for handling image content for display on the image projecting device,
wherein each display panel is tilted from a non-zero tilt of a normal direction of the respective display panel to a first angle with an optical axis of the at least one lens, and each respective first flat filter stack is tilted from a non-zero tilt of a normal direction of each respective first flat filter stack to a second angle with the optical axis of the at least one lens, the first angle being different than the second angle.

15. The system of claim 14, wherein the beam splitting layer comprises a partial-mirror coating on the first filter stack, the beam splitting layer coating operable to split light with a splitting ratio of about 50 percent, and wherein about 25 percent of the light is transmitted from the beam splitting layer to the display if the display is linearly polarized, or about 12.5 percent of the light is transmitted from the beam splitting layer to the display if the display is unpolarized.

16. The system of claim 14, wherein the first filter stack is coupled to the second filter stack and configured into a stacked arrangement including:
the first filter stack having a first linear polarizer stacked between the display panel and a first quarter wave plate, the first quarter wave plate stacked between the first linear polarizer and a beam splitting layer;
the second filter stack having a polarizing beam splitter stacked between a second quarter wave plate and a second linear polarizer, and
wherein the second linear polarizer is adjacent to the at least one refracting lens.

17. The system of claim 14, wherein the first angle is up to about 12.5 degrees from a non-zero tilt of the normal direction of the respective display panel, and the second angle is up to about 25 degrees from the non-zero tilt of the normal direction of the respective filter stack,
wherein the tilt of the respective display panels provides increased spacing between the respective display panels for fitting the interactive head-mounted display device to a user.

18. The system of claim 14, wherein the image projecting device comprises a display on a mobile computing device, the display being an organic light emitting display (OLED).

19. The system of claim 14, wherein the image projecting device comprises a display on a mobile computing device, the display being a liquid crystal display (LCD) and wherein the second filter stack is configured without a linear polarizer.

20. The system of claim 14, wherein the image projecting device includes a display that is a reflective display that comprises a liquid crystal on silicon (LCOS) display.

* * * * *

UNITED STATES PATENT AND TRADEMARK OFFICE
CERTIFICATE OF CORRECTION

PATENT NO. : 10,095,036 B2
APPLICATION NO. : 15/015608
DATED : October 9, 2018
INVENTOR(S) : Carollo et al.

Page 1 of 1

It is certified that error appears in the above-identified patent and that said Letters Patent is hereby corrected as shown below:

On the Title Page

Column 2, Item (56), under "OTHER PUBLICATIONS", Line 2, delete "Appliation" and insert -- Application --, therefor.

Column 2, Item (57), under "ABSTRACT", Line 8, delete "direction." and insert -- direction --, therefor.

In the Claims

In Column 23, Claim 1, Line 24, delete "assembly" and insert -- assembly, --, therefor.

In Column 25, Claim 14, Line 5, delete "system" and insert -- system, --, therefor.

In Column 26, Claim 17, Line 17, delete "filter" and insert -- flat filter --, therefor.

Signed and Sealed this
Second Day of April, 2019

Andrei Iancu
*Director of the United States Patent and Trademark Office*